May 20, 1958 J. J. SHIVELY 2,835,737

TELEPHONE ANSWERING AND RECORDING DEVICES

Filed Feb. 11. 1953 12 Sheets-Sheet 1

INVENTOR
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 2

INVENTOR.
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 3

INVENTOR
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 4

INVENTOR.
JOHN J. SHIVELY
BY
Van Deventer & Shively
ATTORNEYS

TELEPHONE ANSWERING AND RECORDING DEVICES

INVENTOR
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 6

INVENTOR
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 7

INVENTOR.
JOHN J. SHIVELY
BY
Van Deventer & Shively
ATTORNEYS

INVENTOR
JOHN J. SHIVELY
BY
Van Deventer & Shively
ATTORNEYS

INVENTOR
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 10

INVENTOR.
JOHN J. SHIVELY
BY
Van Deventer & Shively
ATTORNEYS

May 20, 1958 J. J. SHIVELY 2,835,737

TELEPHONE ANSWERING AND RECORDING DEVICES

Filed Feb. 11, 1953 12 Sheets-Sheet 11

INVENTOR.

JOHN J. SHIVELY

BY

Van Deventer & Shively

ATTORNEYS

TELEPHONE ANSWERING AND RECORDING DEVICES

Filed Feb. 11, 1953

INVENTOR.
JOHN J. SHIVELY
BY Van Deventer & Shively
ATTORNEYS

United States Patent Office 2,835,737

Patented May 20, 1958

2,835,737

TELEPHONE ANSWERING AND RECORDING DEVICES

John J. Shively, New York, N. Y., assignor to Telephone Answering and Recording Corporation, New York, N. Y., a corporation of Delaware Application February 11, 1953, Serial No. 336,279

21 Claims. (Cl. 179—6)

The present invention pertains to improvements in telephone answering and recording devices.

An object of the invention is to provide improved means for automatically answering a telephone with a prerecorded talk-out message and for recording incoming replies thereto.

A further object is to provide means of the above nature in which all the normal operations of recording and testing the talk-out message, playing back the recorded incoming messages, and if necessary, renewing the incoming message recording medium, may be carried out without skill or practice on the part of the user.

Another object is to produce an instrument of the above type including "answer-back" means to repeat recorded replies to the owner via any outside calling station.

Another object is to provide a device of the above nature which may be installed, if desired, at a location remote from the user's regular telephone.

Another object is to provide an instrument of the above type including a local telephone hand-set serving only the functions of talk-out recording, testing, and message play-back without connection to or interference with the regular line telephone, the machine itself being connected to the line only during automatic answering and message recording or answer-back.

A further object is to provide a device of the above type in which the above normal operations of talk-out recording, testing and playback require the user only to push a button and talk or listen through the local hand-set.

Another object is to provide a system of interlocks by which improper setting of the machine for any function is rendered impossible.

A further object is to provide a device of the type described which in one form employs magnetic talk-out or answering means in combination with disk recording of the incoming messages.

A further object is to provide automatic centering and driving means for the recording disk.

A further object is to provide safety means by which the electrical circuits of the device are disabled and a warning sounded in case the user erroneously attempts to place the machine in operation without a recording disk thereon.

Still another object is to provide disk recording and play-back means in which the control and placing of both the recording and play-back heads are performed automatically, these parts being normally inaccessible to the operator, whereby improper handling of the heads and laborious manual setting thereof are avoided.

A further object is to provide means by which upon operation of the play-back button the device automatically limits the play-back normally to the group of messages recorded since the latest automatic set-up. This provision avoids loss of time in repetitive playing of earlier groups of messages taken on the same blank and which have previously been played and noted.

Other objects and advantages of the invention will become evident during the course of the following description in connection with the accompanying drawings, in which—

Figures 18 and 19 are side views of the stop release-latch corresponding to Figures 16 and 17 respectively;

Figures 14, 15, 28, 30:
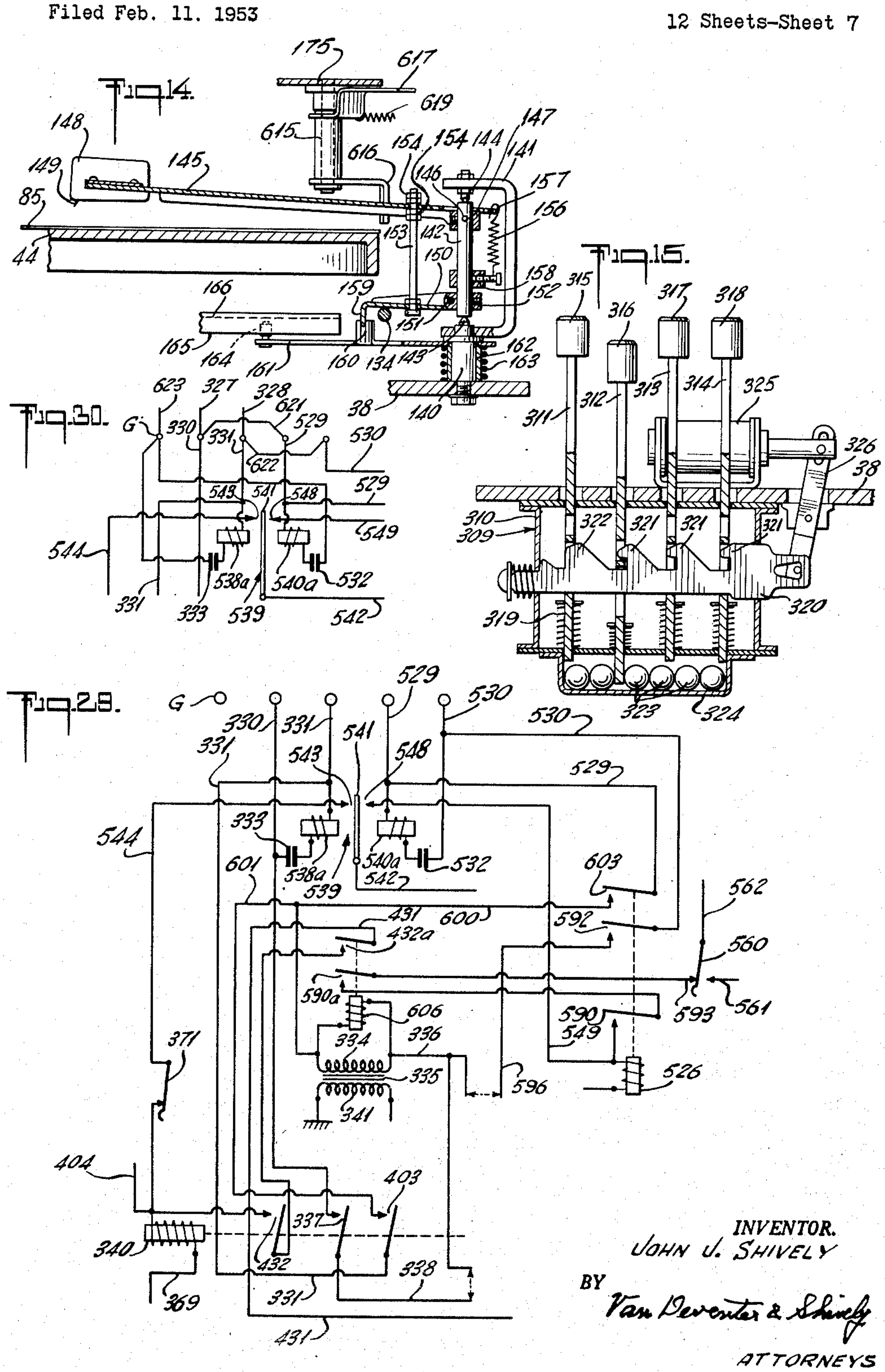
Figure 14 is a detail side view of the pick-up arm and its mounting.
Figure 15 is a side view of the switch release mechanism.
Figure 20:
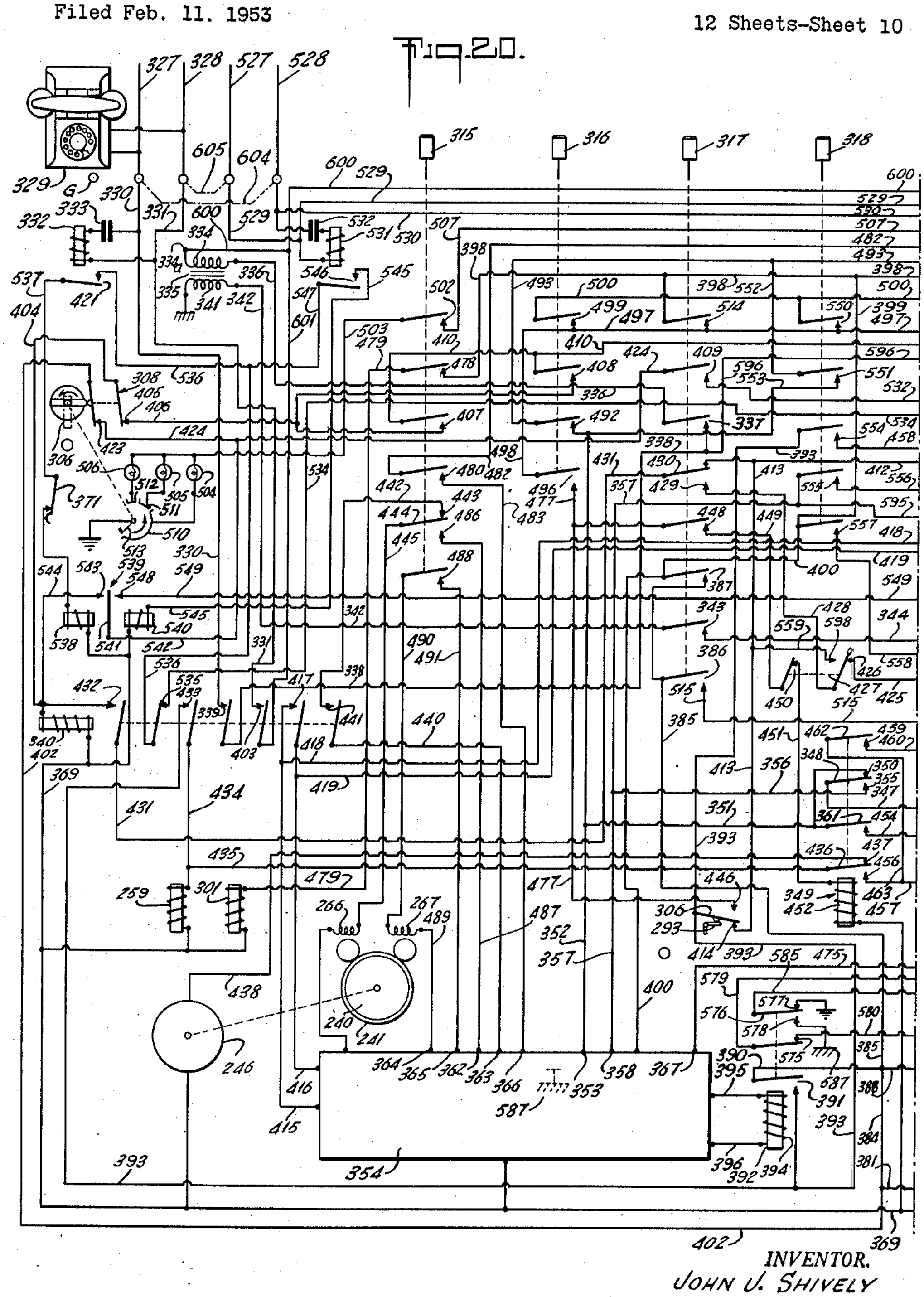
Figure 20A:
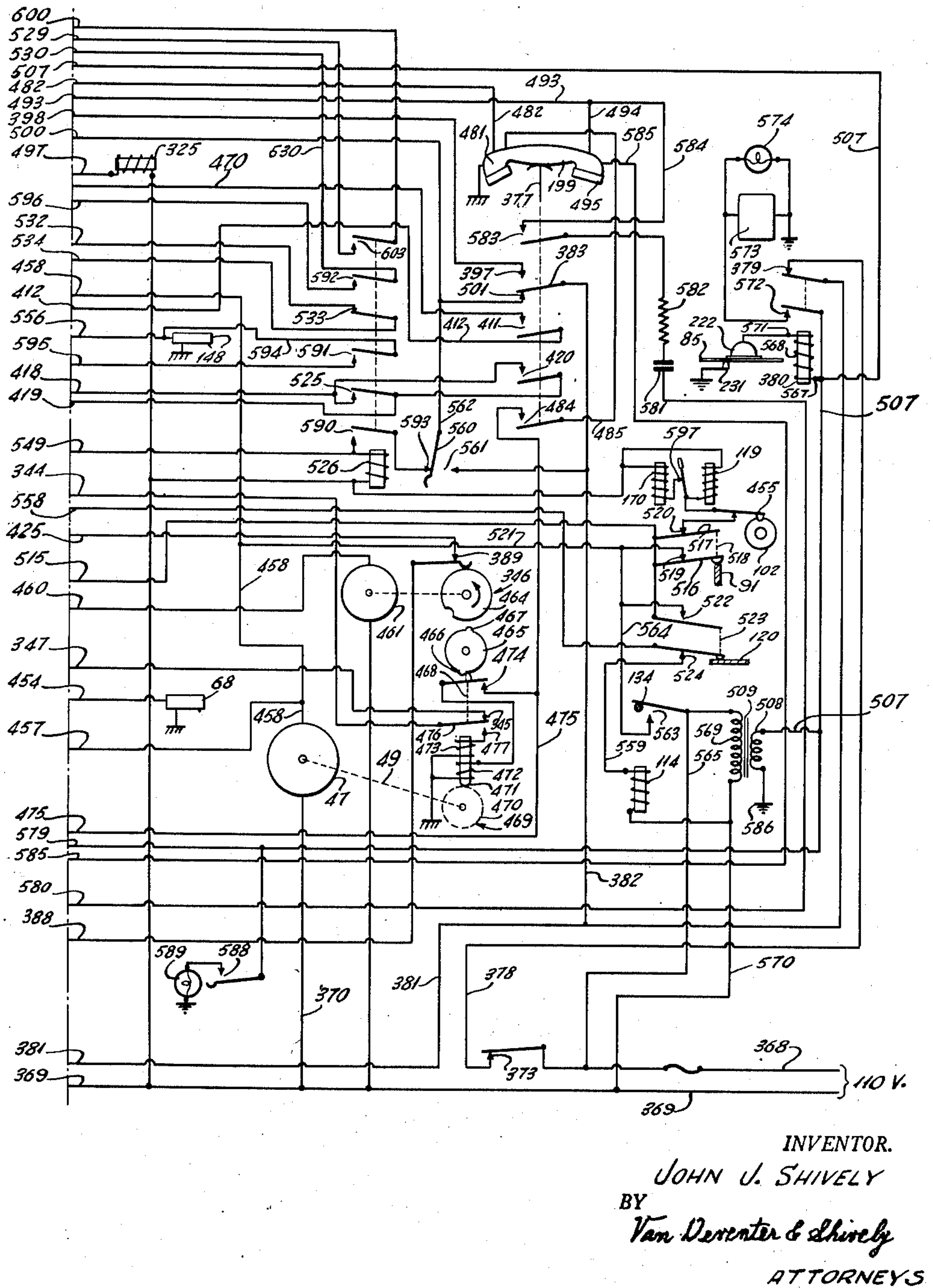
Figure 21:
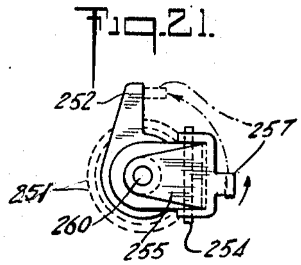
Figure 22:
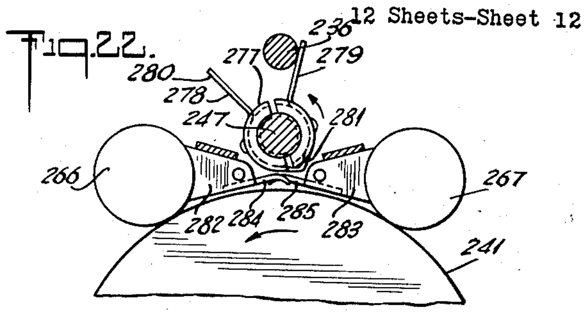
Figure 24:
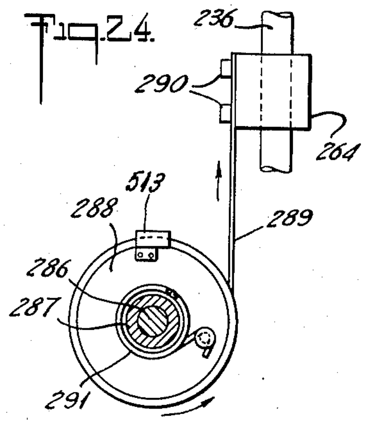
Figure 23:
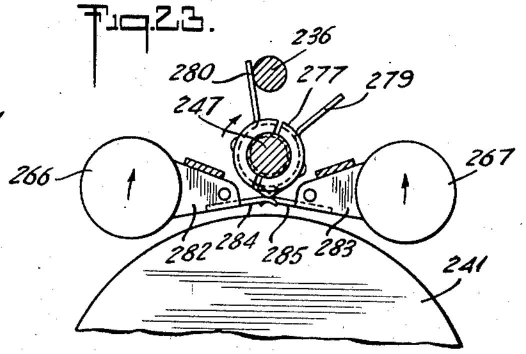
Figure 25:
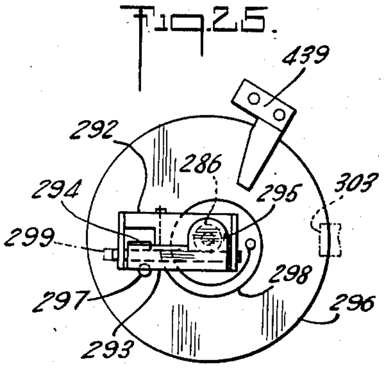
Figure 26:
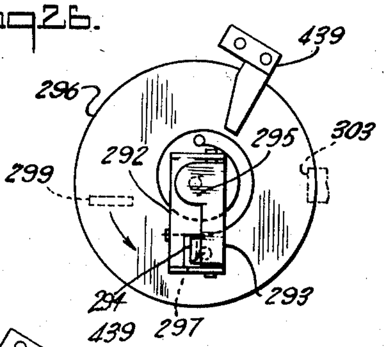
Figure 28:
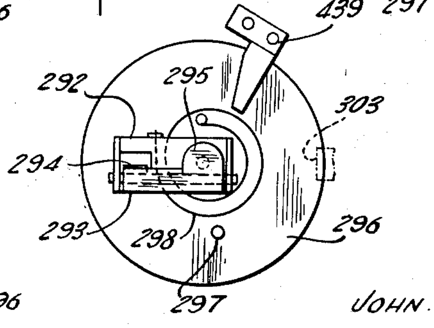
Figure 27:
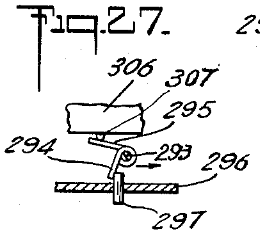

Figures 20 and 20*a* together present a schematic circuit diagram of the device;

Figure 21 is a detail end view of the magnetic recording feed latch;

Figure 22 illustrates the magnetic recorder and eraser head lifter in retracted position;

Figure 23 illustrates the same in operation;

Figure 24 is a top view of the talk-out timer drive mechanism;

Figure 25 shows the talk-out timer in normal position;

Figure 26 shows the same during talk-out recording;

Figure 27 is a fragmental detail view of the mid-cycle trip mechanism;

Figure 28 shows the talk-out timer in set position;

Figure 29 illustrates optional variations in the electrical arrangements, Figures 20 and 20*a*; and Figure 30 is a partial electrical diagram illustrating the application of the device to grounded two-party ringing circuits.

Figure 1:
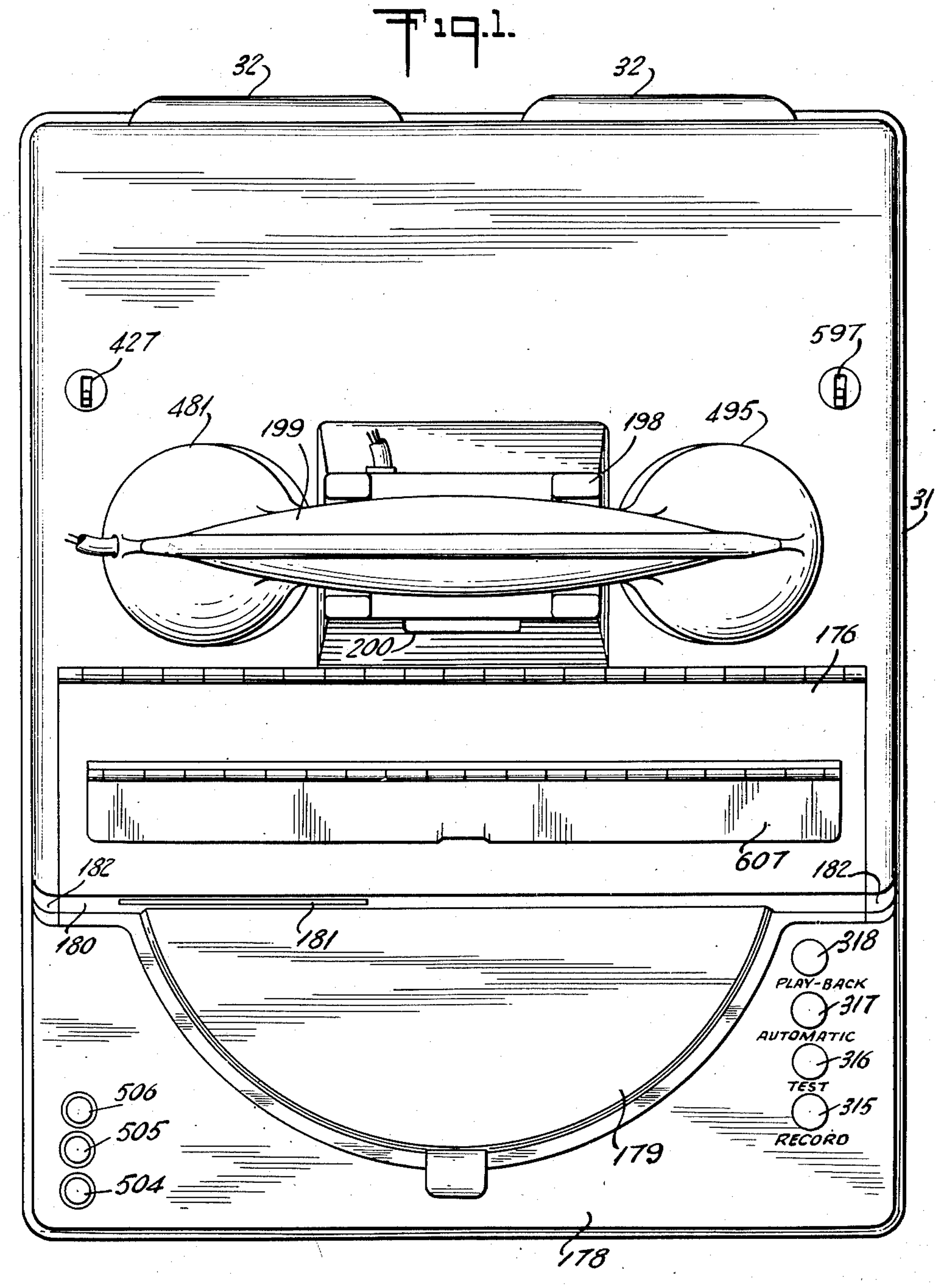
Figure 1 is an exterior top view of a preferred form of the invention.
Figure 2:
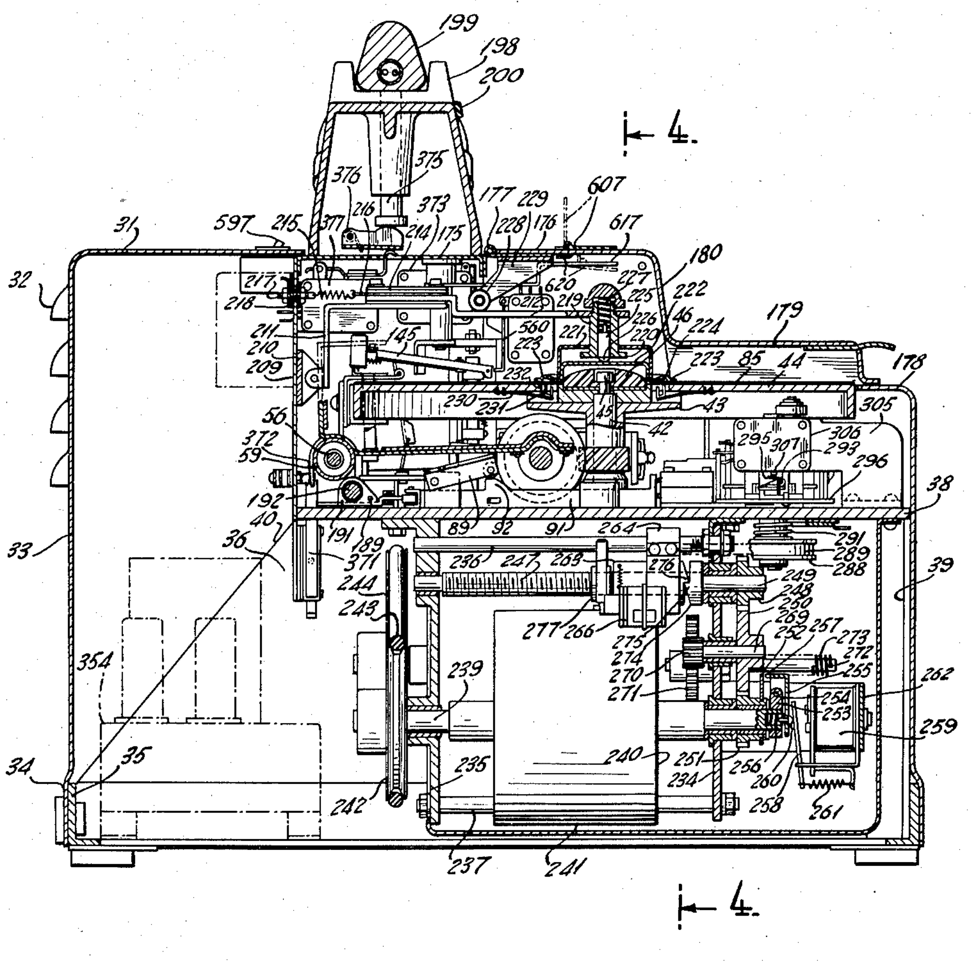
Figure 2 is a longitudinal sectional view of the same.

Referring to Figures 1 and 2, the numeral 31 generally designates a casing enclosing the working parts of the machine, the casing being provided with louvres 32 in the upper portion of its rear wall 33. The lower edge of the casing 31 is preferably formed as an outwardly extended base band 34, seating on and embracing a rectangular frame base 35, Figure 2.

Figure 4:
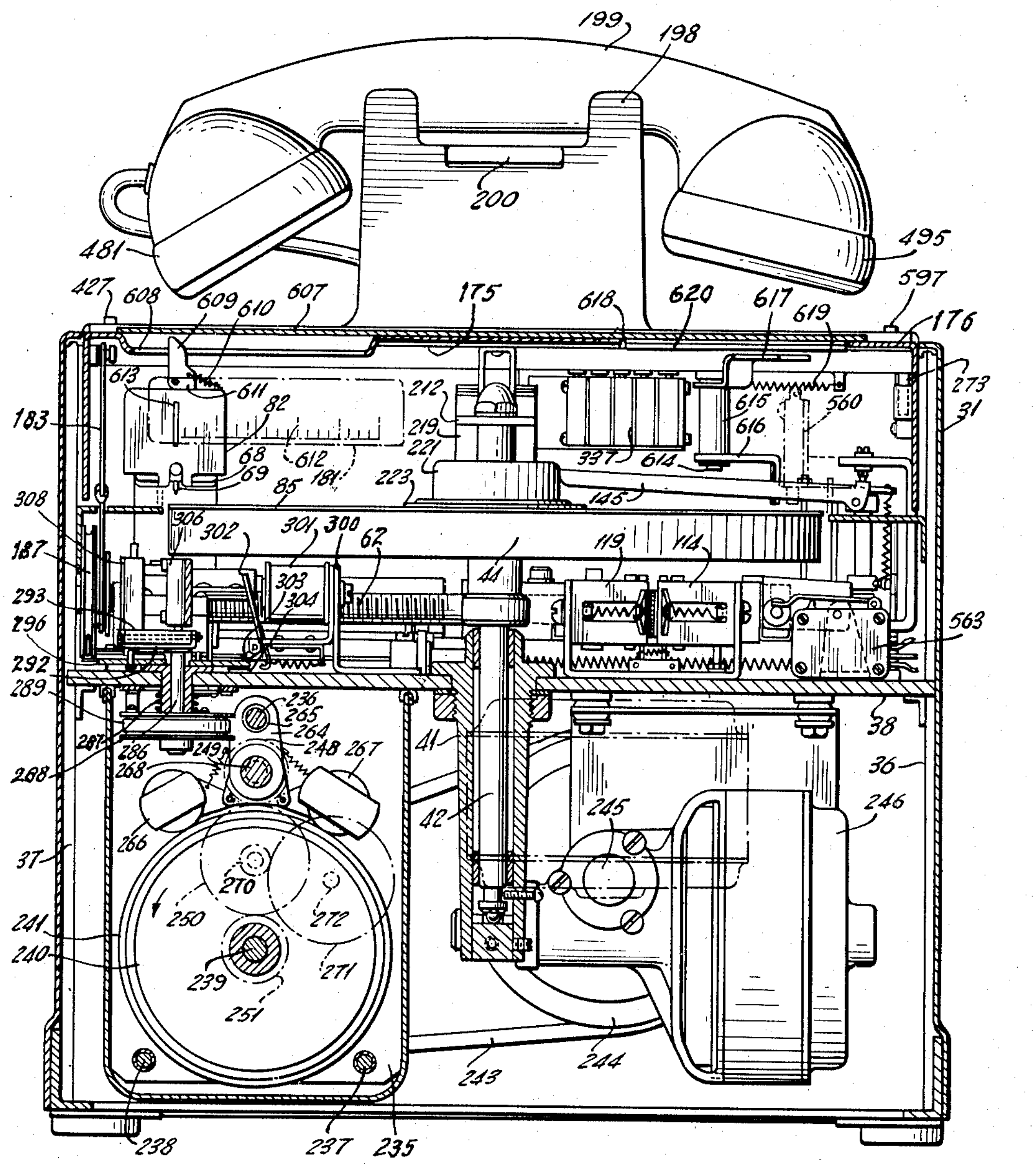
Figure 4 is a jogged transverse sectional view terminating in the plane 4—4, Figure 2.
Figure 5:
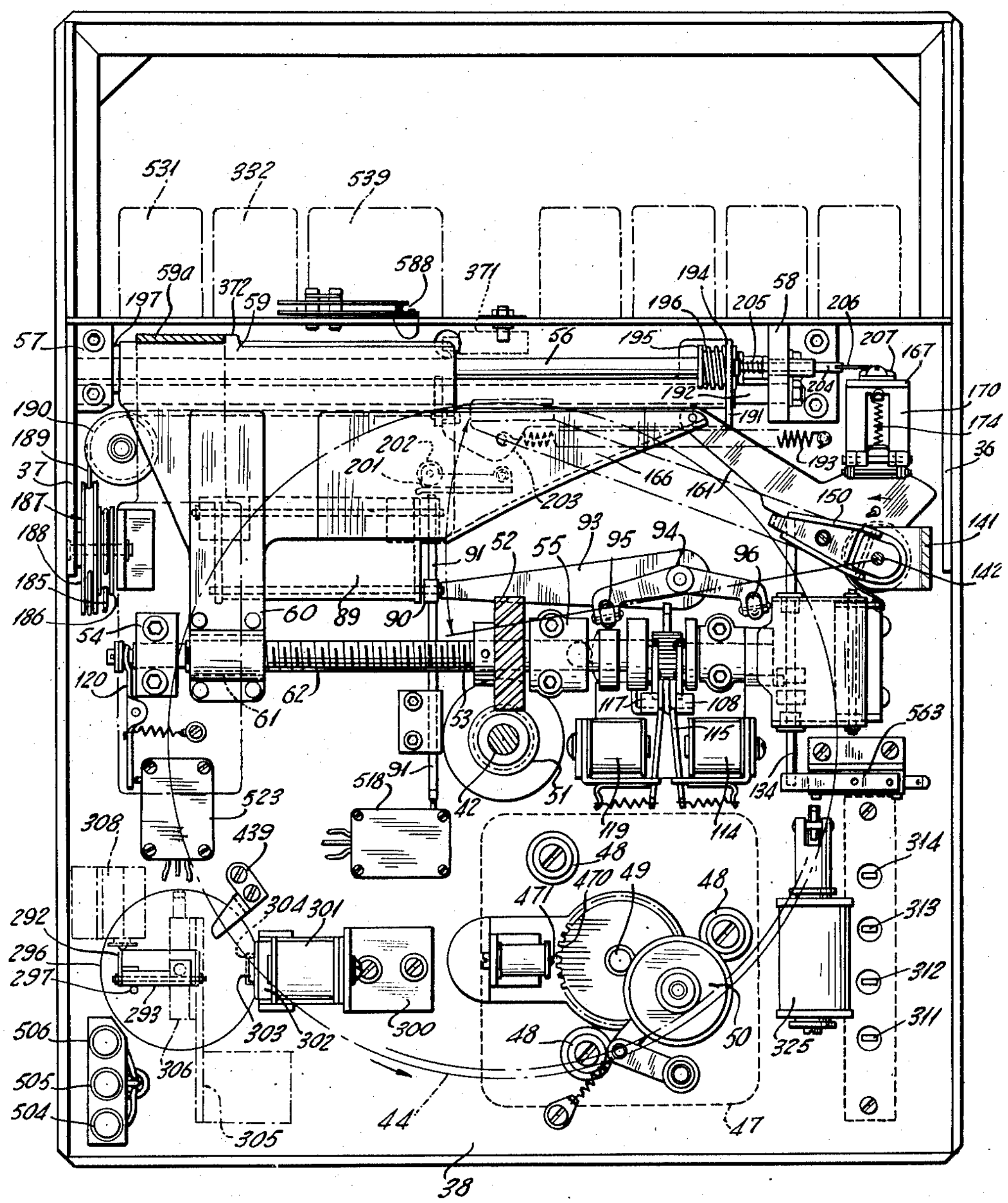
Figure 5 is a plan view of the main operating chassis plate assembly.

A pair of vertical side plates 36 and 37, Figures 2, 4 and 5, are secured to the base 35. A main operating chassis plate 38 is secured to and supported throughout its rear portion by the side plates 36 and 37, corner posts 39 supporting the front of the plate 38. It will be noted from Figure 2 that the main plate 38 terminates a substantial distance forwardly from the rear of the machine, while from this point the side plates 36 and 37 have inclined edges 40 sloping downward to the rear corners of the base 35. This construction provides a large rear compartment which may be opened wide by removal of the casing 31, thus giving complete accessibility to the amplifier and relays of the device, as hereinafter set forth.

A bearing sleeve 41, centrally secured to the main plate 38 as shown in Figure 4, has journalled therein a vertical shaft 42 carrying on its upper end a flange 43, Figure 2. A turntable 44 is secured on the shaft 42 and flange 43 by means of a screw 45 counter-sunk into an upper domed center guide or post 46, the latter being made of insulating material such as a suitable plastic. A motor 47, Figure 5, is suspended on resilient grommets 48 from the plate 38 and has a vertical shaft 49 adapted to rim-drive the turn-table 44 via a stepped and spring-pressed friction roller 50.

A helical pinion 51, secured on the turn-table shaft 42, meshes at right angles with a helical gear 52 secured on a transverse feed and control shaft 53, the latter being journalled in bearings 54 and 55.

Figure 3:
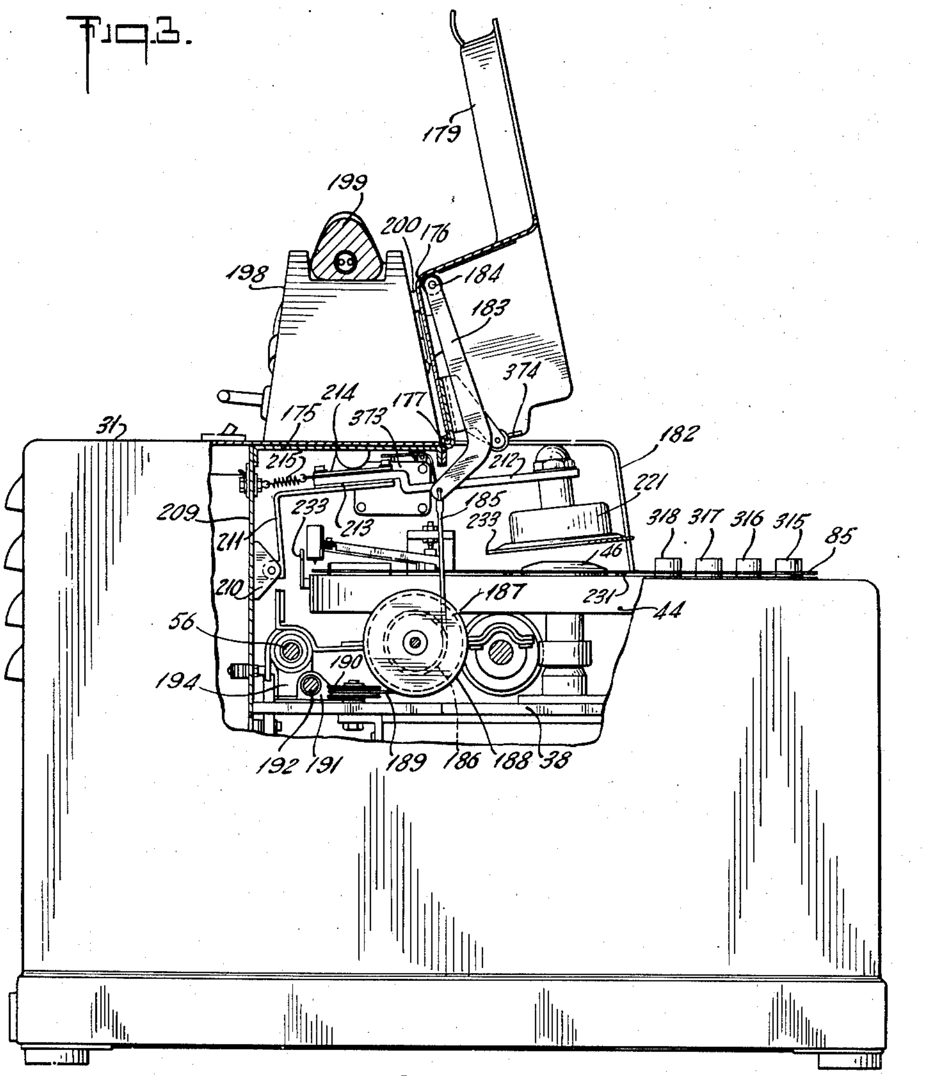
Figure 3 is a side view cut away to illustrate the operation of the disk record locating means.
Figures 6, 7:
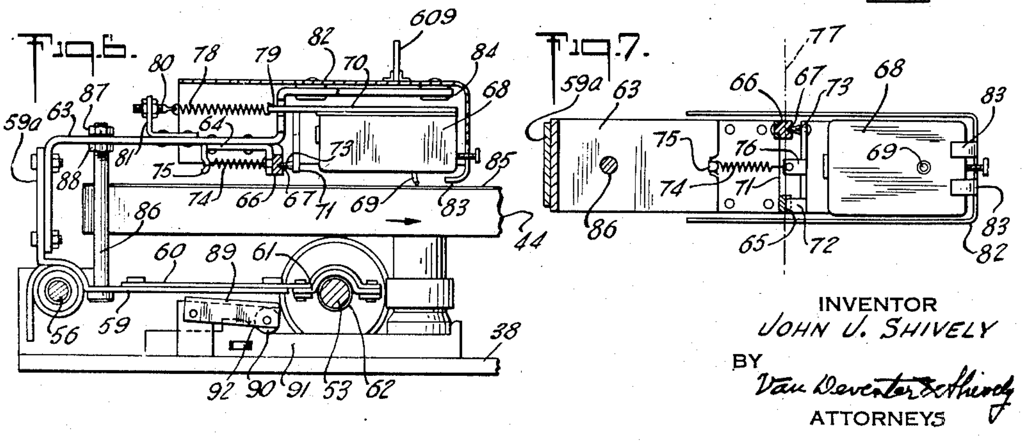
Figure 6 is a detail side view of the disk recorder head mounting.
Figure 7 is a bottom view of the same on the lines 7—7, Figure 6.

A transverse stationary rod 56, supported in blocks 57 and 58 on the rear border of the plate 38, has mounted thereon a carriage 59 which is slidable on the rod 56 and is also rockable thereon through a small angle as shown in Figures 2, 3 and 6. A forwardly extending lower or sub-arm 60 of the carriage 59 has secured to its front end a downwardly directed felt half-nut or shoe 61. The portion of the feed shaft 53 between the gear 52 and the bearing 54 is formed as a fine-threaded lead screw 62 underlying the half-nut 61 in any transverse position of the carriage 59.

An upward extension **59*a* on the rear of the carriage 59 has secured thereto the upper mounting for the recording head, shown in detail in Figures 6 and 7. (In Figures 2 and 3 these upper parts are cut away to disclose the parts behind them, thus avoiding undue multiplicity of drawings.) Referring to Figures 6 and 7, it will be seen that a stepped upper arm 63 is fastened to the extension 59*a* so as to project forwardly above the turntable 44. A downwardly extending bracket 64 on the bottom of the arm 63, one front corner of which is formed in a forwardly directed V 65, Figure 7, holds on the other front corner a button 66 having therein a conical socket 67. An embossing head 68, having a forwardly inclined stylus 69, is secured to a mounting plate 70, the latter having a downwardly directed rear leg 71 formed at one side as a knife edge 72 engaging the V 65, while an acute angled conical point 73 on the other side engages the inner point button socket 67. A tension spring 74, stretched between a hook 75 on the bracket 64 and a central lug 76 on the leg 71, urges the knife-edge 72 and the point 73 into the V 65 and socket 67** respectively.

The knife-edge and point being in transverse alignment, it will be evident that the structure allows the embossing head to rock vertically with negligible friction about the common pivotal line 77, the action being substantially that of an ordinary knife-edge joint except that the use of the conical point 73 and socket 67 locates the junction laterally and prevents the development of any side-play. The pull junction of the spring 74 with the lug 76 is also in the pivot line 77, so that this spring acts solely as a retainer, without exerting any bias on the rocking head assembly. To provide a bias for counterbalancing part of the weight of the embossing head and its plate, a second tension spring 78 is stretched from a second or upper lug 79 on the plate 70 to an eye-member 80 adjustably retained in a small angle bracket 81.

A covering cap 82 has a fork 83 underlying the front end of the embossing head 68 which acts as a stop to to limit the downward rocking of the head when its mounting is raised, while a small bumper 84 on the arm 63 similarly limits possible upward rocking.

When the described device is in recording position, the half-nut 61 engages the lead screw threads 62 as shown in Figure 6, while the stylus 69 engages a suitable record blank 85 on the turn-table 44. A vertical post 86, welded or otherwise secured in the carriage 59, extends through the upper arm 63 and is provided with clamping nuts 87 and 88 on the top and bottom of the latter. Upon initial assembly the nuts are adjusted and firmly tightened to assure such spacing between the lower and upper arms of the carriage assembly that the embossing head 68 can ride freely between its stops 83 and 84 as shown, while the post 86 provides permanent rigidity to the structure.

Since the carriage structure is freely rockable about the rod 54, the entire downward movement due to the carriage and head structure, minus the relatively small pressure of the stylus 69 on the record 85, is resisted in recording position by the feed screw shaft 53 engaged by the felt half-nut 61. The firm pressure between these members causes the resilient surface of the half-nut to conform to the fine threads 62, so that when the shaft 53 is revolved as hereinafter set forth, the carriage assembly carries the head radially inward across the table 44, causing the stylus 69 to inscribe a fine spiral recording track on the blank 85.

Provision for disengaging the feed half-nut 61 from the threads 62, at the same time raising the stylus 69 from the record 85, is made by a hinged rocker 89 of sufficient width as shown in Figure 5, to underlie the lower carriage arm in all lateral positions thereof. The inner end of this rocker carries a roller 90 resting on a forwardly and rearwardly directed bar 91, the latter being slidably retained on the main plate 38. When the bar 91 is in its rearward position, as shown in Figure 6, the rocker 89 lies clear of the carriage arm, so that there is no interference with the described carriage feed. When the bar 91 is moved forward as shown in Figure 2, an inclined wedge or lobe 92 on the bar 91 underrides the roller 90, forcing the rocker 89 upward to tilt the carriage 59 upward out of recording position, the stylus 69 being suspended a substantial distance above the record 85 as shown in Figure 4.

Figures 8, 9, 11, 12:
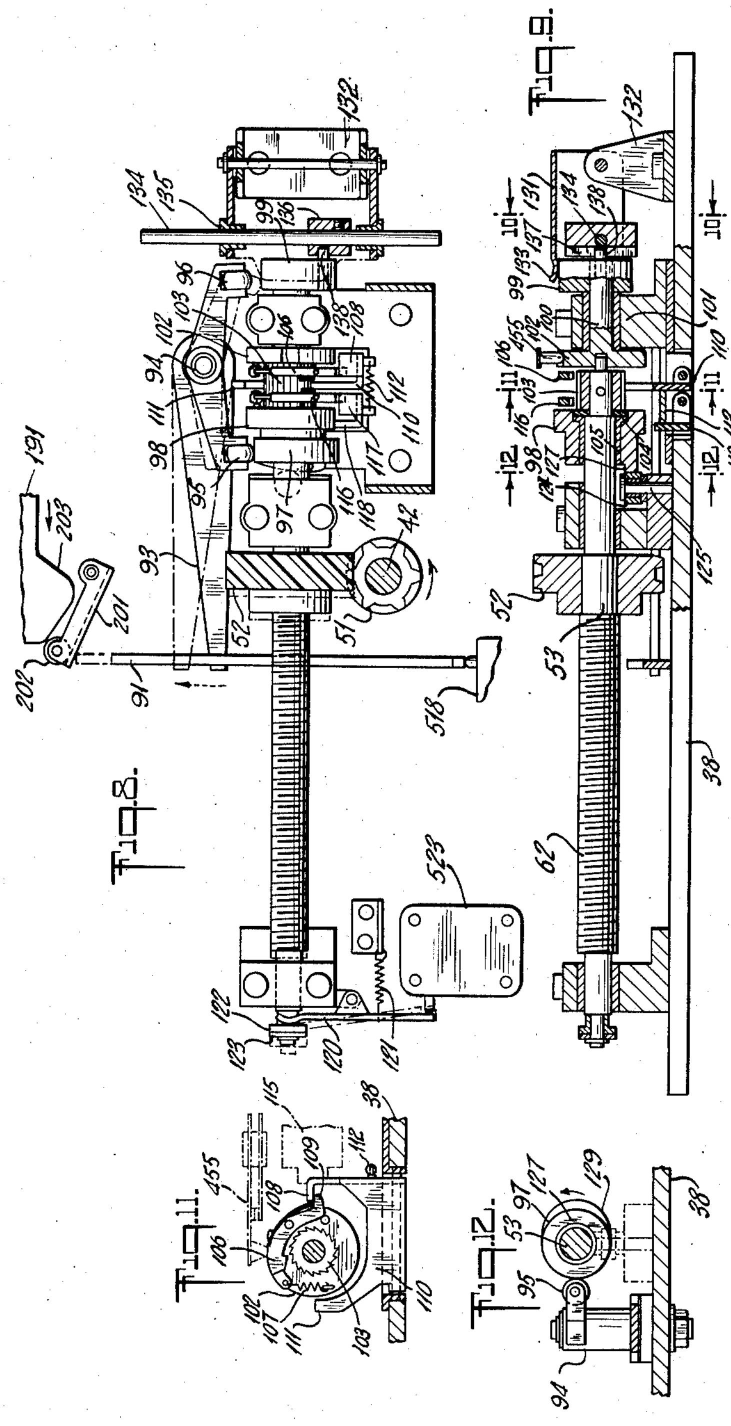
Figure 8 is a detail top view of the arm control mechanism.
Figure 9 is a vertical sectional view of the same.
Figure 11 is a detail view of the pick-up control ratchet clutch in the plane 11—11, Figure 9.
Figure 12 is an inner end view of the recorder trip cam in the plane 12—12, Figure 9.

The bar 91 is movable by a transverse lever 93 secured to an oscillatory turret 94, Figures 5, 8 and 12, this turret also having a pair of oppositely extending roller cam followers 95 and 96. The structures for operating the recorder arm control and related mechanism are best described in detail in connection with Figures 8 to 13.

Referring to Figures 8, 9 and 12, it will be seen that the follower 95 normally rests substantially in engagement with a cam 97, the latter forming part of a thrust collar 98 rotatably mounted on the shaft 53, while a second cam 99 is adapted to engage the follower 96 when the turret 94 is swung as shown in dot-and-dash lines, Figure 8. The second cam 99 is not mounted on the shaft 53 itself, but instead is secured on the outer end of a short shaft 100 journalled in a small pedestal 101 in axial alignment with the shaft 53 and having a flange 102 on its inner end.

A wide ratchet 103 is secured on the end of the shaft 53 between the thrust collar 98 and the flange 102 of the short shaft 100, a thrust washer 104 being interposed between the ratchet 103 and the inner bearing 105 of the thrust collar. A hook pawl 106, shown in side detail in Figure 11, is pivoted to the flange 102. This pawl is urged toward engagement with the ratchet 103 by a spring 107, but is normally held out of such engagement by a detent 108 engaging the heel 109 of the pawl, also as shown in Figure 11. The detent 108 forms part of a rocker 110 which also includes a second detent 111 circumferentially spaced at 180 degrees from the detent 108 and also axially displaced therefrom as shown in Figure 8. A spring 112, Figure 8, normally holds the rocker 110 upright against a stop plate 113, Figure 9. A small electro-magnet 114, Figure 5, has a flap armature 115 engaging the inner side of the detent 108.

When the magnet 114 is energized, it rocks the detent 108 out of engagement with the pawl-heel 109, releasing the pawl, and at the same time swings the second detent into circumferential alignment therewith. The pawl 106 snaps into engagement with the ratchet 103, and rotation of the latter drives the flange 102 and attached parts throughout one-half revolution, at which point the second detent 111 throws out the pawl and stops the rotation thereof. Thereafter the flange assembly remains at the half-way point until the magnet 114 is de-energized, whereupon the spring 112 returns both detents to initial position. The pawl 106 again engages and causes the device to complete its revolution to normal stop position shown in Figure 11. The device thus comprises a one-revolution clutch with an intermediate stop position, the operation being generally similar to that described in my co-pending application Serial No. 239,773 filed August 1, 1951.

The thrust collar 98 is also equipped with a pawl 116 adapted to engage the ratchet 103, this pawl being normally held out of engagement by a detent 117 on a trip rocker 118 controllable by a second electro-magnet 119 (Fig. 5) in exactly the same manner as described except that the trip rocker 118 has no intermediate detent. Therefore, when the magnet 119 is momentarily energized to release the pawl 116, and is then de-energized to restore the detent 117 to initial stop position, the thrust collar 98 is driven continuously throughout a single revolution.

Since the cams 97 and 99 are formed on or operatively attached to the thrust collar 98 and the flange 102 respectively, it will be seen that energizing the magnet 114 first causes the cam 99 to turn one-half revolution; then to complete its revolution when the magnet is de-energized, while momentary energization of the magnet 119 causes one complete continuous revolution of the cam 97.

In operation, the thrust direction of the shaft 53 remains always toward the left. This is assured by two factors, first, that of the leftward thrust generated by the counter-clockwise rotation of the helical pinion 51 against its gear 52. Secondly, a small fork lever 120, Figures 5 and 8, urged by a spring 121, thrusts a flanged collar 122 against a thrust washer 123 retained on the left end of the shaft 53. It will furthermore be evident that when the half-nut 61 is in feeding engagement with the shaft 53 as shown in Figure 6, the thrust reaction to inward feed of the recorder carriage also urges the shaft toward the left.

The leftward thrust of the shaft 53 is resisted by the bearing 105 of the thrust collar against the shaft washer 104, Figure 9, and since, as noted, this thrust remains unidirectional, no lost motion can develop between the thrust surfaces, and wear is automatically taken up.

The leftward urge of the thrust collar member 98 is absorbed by a roller 124, Figure 9, this roller being mounted on a stationary pin 125 and bearing against the inner or left face of the thrust collar. This face is formed as a face-cam 126, shown in diagrammatic development in Figure 13. In normal position, that is when the thrust collar is stationary, the extreme leftward land on a lobe 127 of the cam 126 rests against the roller 124 as shown. When the thrust collar performs a revolution as previously described, the sloping rear flank 128 of the lobe 127 rides past the roller, allowing the entire thrust collar and shaft assembly to yield to the thrust forces of the gear drive and fork 120 previously mentioned, so that during the first 90° of revolution the shaft is moved a short distance to the left as indicated in dot-and-dash lines, Figure 8.

During the next 90° the shaft remains in its leftward position. Thereafter, the forward slope of the lobe 127 acts against the roller 124, forcing the thrust collar and shaft assembly again to the right into normal position, where it is held as the single rotation of the thrust collar is completed.

It will be noted in detail Figure 12 that the lobe 129 of the cam 97 is normally so directed that it acts upon the roller follower 95 during the second 90° of its rotation, swinging the turret 94 clockwise (Figure 8), whereby the lever 93 moves the bar 91 rearwardly to lower the recorder assembly into feeding engagement with the screw threads 62 of the shaft 53 as previously described. Prior to this engagement, the shaft 53 has been moved to the left as set forth above, so that after engagement, as the shaft is again moved to the right to normal position, the stylus 69 generates a comparatively steep inward spiral on the record face, such spirals being indicated at 130, Figures 16 and 17. The purpose and action of these spirals will be described hereafter in connection with the general operation of the device.

Figures 10, 13:
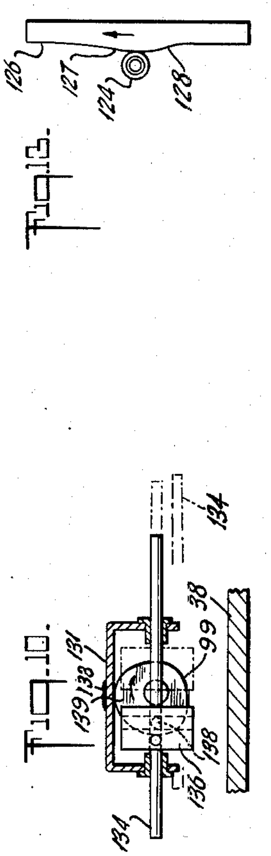
Figure 10 is a detail end view of the pick-up lifter and shifting cam mechanism on the lines 10—10, Figure 9.
Figure 13 is a diagrammatic development of the lead screw shift cam.

Referring to Figures 8, 9 and 10, the numeral 131 indicates a yoke hinged on a bracket 132 secured to the chassis plate 38. A tab 133 on the yoke rides on the top of the cam 99. A horizontal rod 134 is slidably mounted in sleeves 135 in the sides of the yoke 131. A block 136, secured on the rod 134, has a vertical slot 137 engaging an eccentrically disposed pin 138 protruding from the outer face of the cam 99.

It will be seen in Figure 10 that the cam 99 has an enlarged lobe 139 extending throughout substantially half its circumference, and that in normal position as shown the yoke tab 133 is held elevated by the leading portion of the lobe, while the block 136 and rod 134 are held in extreme left-hand position by the pin 138, this position corresponding to extreme forward position in Figure 8. As the cam 99 moves through its initial half-revolution as previously described, the pin 138 and slotted block 136 cooperate after the manner of a Scotch yoke, moving the rod 134 to extreme rear position. During the greater part of this motion the rod is kept elevated by the tab 133 on the cam lobe 139, but as the half revolution nears completion, the lobe runs from under the tab, lowering the rod to bottom position as shown in dot and dash lines, Figure 10. Due to the simple harmonic rearward motion imparted to the block 136 by the pin 138, it will be evident that the lowering of the rod occurs during the last small fractional portion of its rearward stroke.

Similarly, as de-energization of its trip magnet causes the cam 55 to perform its second half-revolution, the rod 134 is moved forwardly in lowered position, then raised to the initial elevated position shown as the cam's cycle is completed. During the described initial half-turn of the cam 99, the lobe 139 engages the follower roller 96, turning the turret 94 and lever counter-clockwise as shown in full lines, Figure 8, to raise the recording mechanism to normal or disengaged position as previously explained.

The above-described apparatus, in addition to disengaging the recorder, controls the operation of the reproducer or pick-up, which is constructed as shown in Figure 14. A spud 140, secured to the plate 38, has secured to the upper end thereof a C-shaped yoke 141. A vertical spindle 142 is rotatably retained between opposed pivot points 143 and 144 in the top of the spud 140 and yoke 141 respectively. A light channel arm 145 is horizontally pivoted near its rear end on a cross pin 146 disposed through the spindle 142 and a spacer collar 147. The arm 145 extends over the turn-table 44 and carries at its front end a pick-up head 148 equipped with a permanent needle 149 adapted to engage recordings on the record 85.

A small sub-arm 150 is hinged on a second cross-pin 151 mounted in a block 152 secured on the lower portion of the spindle 142, the hinge-pin 151 being parallel to the main arm pin 146 so that the main and sub-arms may rock vertically in the same plane. A light spacer rod 153 is retained at its top end in the arm 145 by upper and lower nuts 154 and 155, and is similarly attached to the sub-arm 150. The retaining joints between the rod 153 and the two arms, while close enough to prevent substantial end-play, are sufficiently free to allow the arms to rock up and down without binding throughout the limited angles required in operation as hereinafter described.

A vertical tension spring 156 is attached at its upper end to a short rear extension 157 of the arm 145, and at its lower end to a collar 158 on the spindle 142. The collar 158 is adjustably secured on the spindle, by which means the spring 156 may be set to counterbalance the weight of the arm 154 and attached parts to any desired extent necessary to provide proper contact pressure of the needle 149 on the record 85.

The horizontal shift rod 134, previously described, is of sufficient length to underlie the sub-arm 150 at all times, and in normal or upper position holds the sub-arm raised as shown in Figure 14 to keep the needle 149 elevated a substantial distance above the record 85.

Figure 16:
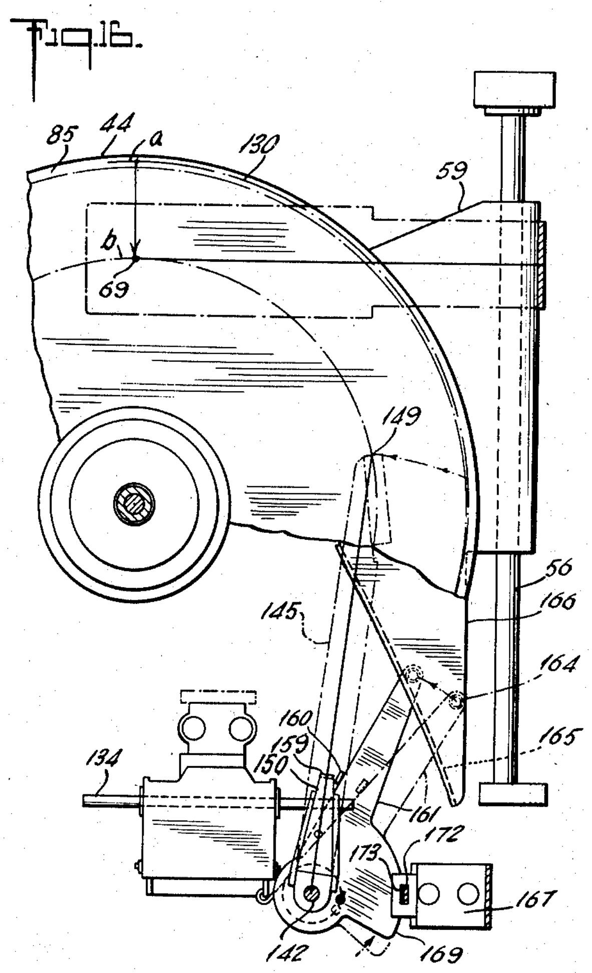
Figures 16 and 17 are top illustrations of the automatic play-back limiting mechanism.
Figure 17:
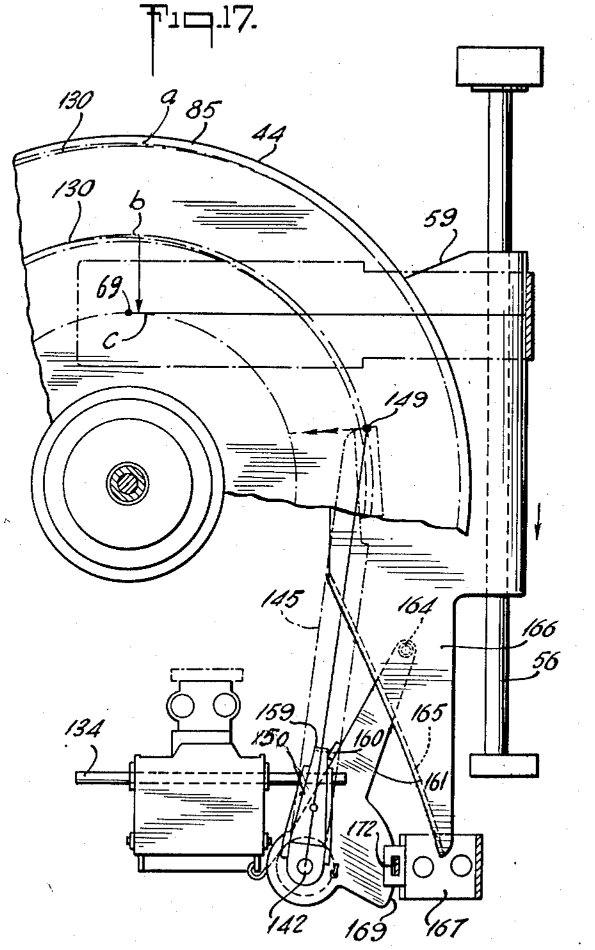
Figure 18:
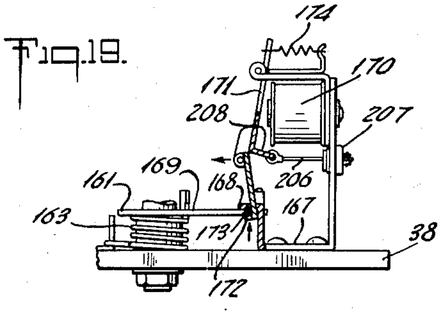

The sub-arm 150 has on its front end a downwardly extending toe 159 adapted to engage horizontally an upwardly directed detent 160 on a stop-arm 161. The arm 161 is attached to a collar 162 loosely swivelled on the spud 140. A light torsion spring 163 urges the arm counter-clockwise when viewed from the top as shown in Figures 16 and 17. The end of the arm carries a small roller 164 adapted to engage a downwardly turned diagonal lip 165 on the end of an extension 166 of the recorder carriage 59. Thus the lip 165 serves to limit the counter-clockwise swing of the arm 161, the extent of swing permitted being dependent on the lateral position of the recorder carriage 59. However, the arm 161 is normally clamped against swinging by a device shown in Figures 19 and 20.

Referring to Figure 19 in connection with Figure 17, the numeral 167 indicates a bracket having a short tab 168 closely overlying an arcuate portion 169 of the lever 161. An electromagnet 170 horizontally secured to the rear leg of the bracket 167, has a downwardly extending pivoted armature 171. A hook-shaped link 172 is hinged to the lower end of the armature and extends through a slot 173 in the tab 168 so as to hook under the edge of the arcuate lever portion 169. A tension spring 174 urges the armature 171 away from the magnet 170 as shown in Figure 19, so that the hook 172 is drawn upward with a toggle action. By this means the portion 169 is pinched or clamped between the hook and the tab 168, thus locking the lever 161 against rotation by its spring 163.

Figure 18:
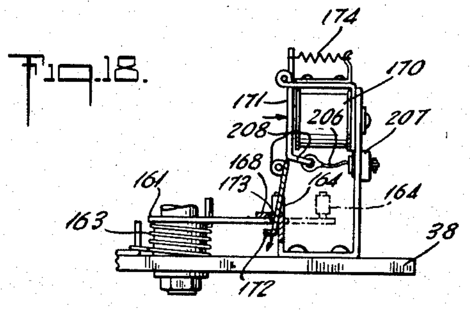

When the magnet 170 is energized it draws the armature 171 toward it, causing the hook 172 to release the arcuate lever portion 169 as shown in Figures 16 and 18. Thereupon the spring 163 swings the lever 161 counter-clockwise until it is stopped by contact of its roller 164 with the lip 165, the stop portion being dependent, as previously noted, on the lateral position of the carriage 59. Thus in Figure 16, the dot and dash line representation of the lever 161 shows the initial position thereof a spreviously set when the carriage 59 was in extreme leftward position, that is when the stylus 69 overhung the border of the blank record 85 at *a*. As the carriage moved inward during recording to carry the stylus to point *b* as shown, the lever 161 remained locked in outer position, until its release by the magnet 170, whereupon it assumes the new position shown in full lines. The magnet 170 is then de-energized to lock the lever 161 in the new position. When the carriage again is fed to the right, causing the stylus 69 to record a second zone from *b* to *c*, Figure 17, the stop lever 161 remains locked while the lip 165 again moves away from the roller 164 as shown.

The relationship of the stop lever 161 and the reproducer arm assembly is such that when the sub-arm toe 159 is in engagement with the detent 160, the reproducer needle 149 over-lies the circumferential locus of the stylus 69 established at the time the arm 161 was locked. To illustrate in Figure 17, the rod 134 has carried the sub-arm 150 and main arm 145 outwardly until the outward swing is stopped by the detent 160. In this position, it will be noted that the needle 149 over-lies the locus *b*. Therefore, when the rod 134 lowers the reproducer assembly as previously described, the needle 149 engages the record at the outer edge of the recorded zone *b—c*. Thereafter the reproducer accordingly traverses only the zone *b—c*, ignoring the previously recorded zone *a—b*. In other words, the reproducer operation is automatically limited to the recording or recordings made since the latest setting of the recorder stylus 69 on the record blank. When, after the recordings of zone *b—c* have been reproduced and duly noted as hereinafter set forth, the recorder stylus 69 is again lowered into engagement with the record, the stop arm 161 again assumes a new limiting position in the manner described, so that the subsequent reproduction will automatically be limited to the new zone recorded. Thus when the device is operated alternately for recordings and for play-back, the record may receive a series of successive zones of recording of various widths, dependent on the duration of recording in each case, while the reproducer will select and play back the latest recording zone regardless of the width thereof. The purpose and advantages of the above provision will be fully set forth hereinafter in connection with the over-all operational description.

It was previously noted that after the recording mechanism has been lowered into engagement with the lead screw threads 62, Figures 6 and 8, the completion of the rotational cycle of the thrust collar 93 moves the shaft 53 and the engaged recording mechanism inward through a short distance, causing the stylus 69 to inscribe a relatively steep spiral 130 on the record blank 85, Figures 16 and 17. It will be evident that these spirals 130 comprise the beginnings of the recording zones *a—b* and *b—c*, thus setting up separation bands of substantial width between the successive recording zones proper. As these separation bands are occupied by the spirals 130, the spirals act as lead-ins for the reproducing needle 149, so that the latter will track in properly when lowered anywhere within the substantial width of the separation bands. This provision eliminates any requirement for critical precision in the described locating means for the reproducer needle 149, and insures ample leeway for wear therein with continued proper operation over long periods of use. The slightly curved contour of the locating lip 165, Figures 16 and 17, is such as to reconcile the arcuate path of the reproducer needle 149 with the straight-line travel of the recorder stylus 69.

A normally closed limit switch 371, Figures 2 and 5, is adapted to be opened by a finger 372 on the recorder carriage 59 as the latter approaches the inner end of its normal zone of travel, this switch being connected in a manner hereafter explained, to disable the recording device when the record surface is exhausted.

Referring to Figures 2 and 4, the tops of the side plates 36 and 37 are spanned by a lateral bridge 175. A closure flap 176 is laterally hinged at 177 to the bridge 175 on the same level as the rear top of the casing 31. The front portion 178 of the casing 31 is depressed to a level slightly below the top level of the turntable 44 as shown in Figure 2, while the flap 176 has a shallow front portion 179 adapted to complete a closure over the turntable, this portion being of appropriate sector plan shape as shown in Figure 1. The upper and lower portions of the flap 176 are joined by an inclined face 180 having a small transparent window 181 in the left side thereof. The sides 182 of the casing 31 are also inclined to match the slope of the flap face 180, so that the casing and flap form in effect a smooth unitary enclosure when the flap is closed as shown.

A snap switch 373, hereinafter termed the flap switch, mounted below the bridge 175 as shown in Figures 2 and 3, is held closed by a tab 374 on the flap 176 when the latter is closed, but is adapted to open as the flap is raised.

Referring to Figures 3 and 4, an angular link 183 is mounted at one end on a pivot 184 in the upper left-hand corner of the flap 176. The lower end of the link is fastened to a flexible cable 185 which runs on and is secured to the smaller sheave 186 of a double-diameter pulley 187 pivotally mounted on the inner side of the side plate 37 (Figures 3, 4 and 5). From the larger diameter sheave 188 a second cable 189 runs around a guide pulley 190 to a drag member 191 which is laterally slidable on a stationary rod 192 parallel to and downwardly adjacent the recorder guide rod 56.

Referring to Figure 5, it will be seen that the drag member 191 is urged to the right by a long tension spring 193 which keeps a tension at all times on the cables 189, 185, and the link 183. An ear 194 on the drag member loosely encircles a spool 195 slidably mounted on the recorder guide rod 56, a short compression spring 196 urging the spool 195 inward to form a spring bumper.

In the normal or closed position of the closure flap 176 the drag member 191 is held by the spring 193 in extreme right-hand position as shown in Figure 5.

When the flap 176 is opened upward as shown in Figure 3, traction is applied via the link 183, cable 185, pulley 187 and cable 189 to draw the drag member 191 leftward along its rod 192. Assuming the recorder assembly to have previously moved inward in the course of recording, the bumper 195 in its leftward movement engages the carriage 59 and carries it again to the left into initial or extreme left position against a resilient stop washer 197, Figure 5.

Referring to Figures 2 and 3, the numeral 198 indicates a telephone cradle secured on the top of the bridge 175 and carrying a hand-set 199. The weight of the hand-set normally acts through plungers 375 and a rocker 376 on a five-pole gang switch 377, hereinafter termed the "hook-switch" and explained in diagrammatic structure and function in connection with Figure 20*a*.

A resilient bumper 200 in the front of the cradle 198 serves as a stop to limit the opening swing of the flap 176. It will be seen that in extreme open position, Figure 3, the angularity of the link 183 has permitted the line of tension between the sheave 186 and the pivot 184 to move rearward past the center of the hinge 177, so that the tension of the cable system holds the flap open against the stop 200 until the flap is swung forward manually in closing it.

In the above-described operation in which raising the closure flap 176 restores the recording mechanism to its initial or extreme leftward position, it is essential that the recorder mechanism be in its upper or disengaged position prior to its leftward movement. In case the last previous operation has been play-back, this release will already have been effected by actuation of the turret follower 96 by the cam 99, Figure 8, as previously described. However, in case the flap is raised under other circumstances wherein the recording mechanism is in engaged position, initial disengagement is accomplished as follows:

A small arm 201 provided with a terminal roller 202, Figures 5 and 8, is pivoted to the chassis plate 38 in such location as to be swung rearwardly by the elevating bar 91 when the latter is moved rearwardly to lower the carriage. In this rearward position of the arm 201, as illustrated in Figure 8, the roller 202 lies laterally in line with a tapered cam lobe 203 forming part of the drag member 191. As the drag member 191 starts its leftward movement the lobe 203 swings the roller 202 and arm 201 forward, so that if the bar 91 is initially in rearward position, the arm 201 thrusts it forward to elevate the recorder mechanism in the manner previously set forth. The total traverse of the drag member 191 provided in opening the flap 176 is sufficiently greater than the maximum possible inward feed of the recorder mechanism, that the described elevating action always is carried out before the bumper 195, Figure 5, can encounter and start the restoring movement of the carriage 59.

During restoration of the recorder mechanism, it is also necessary that the reproducer stop arm 161 be unlocked to enable the inclined lip 165 to restore it to outer position as shown in Figure 5. For this purpose a small plunger 204, slidably mounted in the block 58 and pressed inwardly by a spring 205, is connected to a short cable 206 which runs through a ceramic guide grommet 207 in the latch bracket 167 and is in turn connected to a finger 208 on the latch armature 171, as shown in Figures 18 and 19. When the drag member 191 is in normal right-hand position, Figure 5, the ear 194 holds the plunger 204 to the right, the drag spring 193 being stronger than the plunger spring 205. Movement of the drag member 191 to the left releases the plunger 204, whereupon the spring 205, acting through the cable 206, draws the latch armature 171 rearwardly to unlatch the stop-arm 161 as required. Thus, while during normal operation the unlatching of the arm 161 is carried out automatically by means of the magnet 170 as previously explained, during reset the unlatching is accomplished mechanically without energization of the magnet. The advantage of this dual unlatching control will be evident, since at times the flap 176 may be opened to change a record while the machine is disconnected from its source of current, in which case of course no current would be available for energizing the magnet.

The automatic centering and driving means for the record 85 are best explained by reference to Figures 2 and 3. A transverse vertical plate 209 is secured to the rear edges of the side plates 36, 37, and the main chassis plate 38. A bracket 210, secured to the plate 209, has horizontally pivoted thereto an angle member 211. A forwardly extending metallic arm 212 is secured to the member 211, being electrically insulated therefrom by non-conducting plates 213 and 214. A tension spring 215, hooked between a conducting plate 216 on the arm 212 and a screw 217 disposed in an insulating bushing 218 in the rear plate 209, urges the angle member 211 and arm 212 counterclockwise, thus tending to raise the front end of this arm.

The spring 215 forms part of an electrical connection for a purpose hereinafter explained, and accordingly is made of good conducting material such as beryllium copper.

The front end of the arm 212 has secured therein a downwardly extending sleeve 219 having a flange 220 at its lower end. A downwardly directed cup 221 is disposed about the sleeve 219 in wide circumferential clearance relation above the flange 220. This cup is nested on and secured to a second underlying cup 222 which slidably fits the exterior diameter of the turntable center boss or record guide 46. A bottom flange 223 on the lower cup 222, having a downwardly directed groove 224, is adapted to press against the record 85 surrounding the center boss 46. A plunger 225, slidably mounted in the sleeve 216, has a rounded lower point 226, pressed against the top of the lower cup 222 by means of a compression spring 227.

Referring to Figure 2, when the flap 176 is closed an insulating roller 228, pivoted on a bearing bracket 229 secured to the under side of the hinge, holds the arm 212 in horizontal position as shown. In this position the lower cup flange 223 presses the record 85 under the compression of the spring 227. The upper cup 221 rides clear both of the sleeve 219 and the flange, and as the point of pressure contact of the plunger nose 226 on the lower cup 222 falls in the axial line of the turntable shaft 42, the resistance of this thrust contact point to rotation is negligible. Consequently, the entire cup assembly revolves with the turntable 44, comprising a rotary clamp which holds the record 85 tightly on the table. By this means the record is driven positively without the use of keys, eccentric driving pins or the like.

Small spring fingers 230, Figure 2, are secured on the bottom of the turntable 44 and carry contacts 231 projecting upward through holes 232 in the table below the clamping flange groove 224. When a record 85 is clamped on the turntable 44 as shown, the contacts 231 press against the record 85, and as the latter is made of a suitable insulating plastic such as vinylite, no electrical connection normally occurs at this point. It will be evident, however, that if the record were not present, the contacts 231 would engage the flange 223 within the groove 224, thereby completing a ground connection for the previously mentioned electrical circuit through the arm 212, spring 215 and screw 217. This possible connection comprises part of a safety circuit, the purpose and action of which will be explained in connection with the electrical diagram, Figure 20, and the general operation of the machine.

When the record 85 is to be changed, the flap 176 being raised as shown in Figure 3, the roller 228 is moved forward and upward, allowing the spring 215 to raise the arm 212 as shown. Thereby the cup flange 223 is raised clear of the domed hub 46. At the same time the small contacts 231 spring upward, raising the record 85 slightly from the turntable 44 so that the record may readily be grasped by its front edge and drawn out through the front of the machine. A fresh record may then be inserted. Locating stops 233 adjacent the sides and rear of the turntable 44 automatically locate the record in general registry with the hub 46. Exact or careful initial registry is unnecessary, due to the domed shape of the hub and the fact that as the flap 176 is closed the flange 223 guides the record down over the hub into accurately centered position and clamps it therein as shown in Figure 2. It will be obvious that the above record-changing operation requires a minimum of skill or care on the part of the operator.

*Talk-out mechanism*

Referring to Figures 2 and 4, a pair of end plates 234 and 235, spaced by rods 236, 237 and 238 to form a frame, are secured to the bottom of the chassis plate 38. A horizontal shaft 239, journalled in the plates 234 and 235, has secured thereon a drum 240. The outer surface layer 241 of the drum 240 is of material suitable for magnetic recording, such as cobalt-nickel plate, neoprene impregnated with iron oxide, or the like. A grooved pulley 242 on the rear end of the shaft 239 is connected by a belt 243 with a driving pulley 244, the latter being operable via an irreversible worm-gear speed reducer 245 by a second motor 246, Figure 4.

A lead screw 247 is journailed in the plates 234 and 235 above and parallel to the drum 240. A gear 248 secured on the front end of the lead-screw shaft extension 249 meshes with a non-metallic gear 250 which in turn is in mesh with a pinion 251 rotatably mounted on the shaft 239. The hub of the pinion 251 has fastened thereto a radially extending dog 252. A short lever 253 secured on the end of the shaft 239 carries a cross pin 254 on which is mounted a small clutch rocker 255, Figures 2 and 21. A light compression spring 256 urges the tip 257 of the rocker inward, tending to bring it into circumferential driving relation with the dog 252, but this engagement is normally prevented by the armature 258 of an electro-magnet 259, the armature normally being pressed against a central button 260 on the rocker 255 by a spring 261 of greater effective strength than the light clutching spring 256. The magnet 259 is mounted in axial alignment with the shaft 239 on a bracket 262 secured to the front plate 234.

If the shaft 239 and rocker 255 are rotating as illustrated in Figure 21, and the magnet 259 is energized to withdraw the armature 258 and release the clutch rocker 255 as noted, the tip 257 is normally snapped into position rotationally in line with but clear of the dog 252, after which continued rotation of the tip 257 carries it to engage and drive the dog and its pinion 251. If by coincidence the tip 257 is urged inward at the exact instant it is passing the dog it simply slips over the dog's outer face, snaps in behind it, and picks it up in driving relation on the next revolution. In any case, since there are but one dog and one driving rocker, it will be evident that the angular driving orientation between the drum 24 and pinion 251 is the same after each engagement.

An elongated nut 263 is mounted with a working fit on the lead screw 247, Figures 2 and 4. An upwardly extending lug 264 on the nut 263 has therein a bushing 265 which encircles the rod 236 and is slidable thereon. This provision prevents the nut 263 from turning, so that as the lead screw 247 revolves the nut is fed along it.

A magnetic recorder-reproducer head 266 and a magnetic erasing head 267 are horizontally hinged to the left and right sides of the nut 263, Figure 4, so as to rest in operative engagement with the magnetic surface 241 of the drum 240, small bias springs 268 being provided to counterbalance part of the weights of the heads. The drum 240 is arranged to turn counter-clockwise as shown, and the circumferential alignment of the two heads is such that the zone traced on the drum surface by the recording head 266 has previously under-ridden the erasing head 267. The screw 247 is equipped with a right hand thread, and when the pinion 251 is clutched to the revolving drum-shaft 239 as previously set forth, the counter-clockwise rotation causes the nut 263 to be fed rearwardly so that the heads 267 and 266 trace a helical path on the drum surface.

The shaft 269 of the idler gear 250 has on its inner end a pinion 270 meshing with a large gear 271 on a spindle 272, hereinafter referred to as the return spindle. By the foregoing gear train, when the feed mechanism is clutched to the drum shaft 239 to rotate the feed screw 247 as previously described, the return spindle 272 is revolved at reduced speed. A torsion spring 273 on the spindle 272 is adapted to be wound up as the feed mechanism is driven as noted to feed the nut 263 rearwardly. Thereafter, when the latch 255 is released from the dog 252 to uncouple the described feed mechanism from the shaft 239, the energy stored in the spring 273 operates to drive the feed mechanism including the screw 247 in reverse direction, returning the nut 263 and its attached parts forward to the initial position as shown in Figure 2. A collar 274 on the feed screw 247 has thereon a narrow tapered step 275 which abuts a similar step 276 on the nut 263 as the latter moves into full return position, thus providing a positive return stop for the feed mechanism in its predetermined normal position. It will be noted that as the stop action on the nut 263 is circumferential instead of longitudinal, no longitudinal jamming or locking is produced between the threads of the nut and screw. This provision prevents the necessity for heavy "break-away" torque when the next feeding operation is started.

An internally threaded split bushing 277 of oil-impregnated metal Figures 2, 22 and 23, is disposed on the feed screw 247 a short distance inward from the nut 263, being held in place with a light friction on the screw threads by a generally U-shaped spring clip 278. When the screw revolves in feeding direction, Figure 22, the friction of the bushing 277 on the screw 247 causes the former to revolve until the right leg 279 of the clip 278 encounters the guide rod 236. Similarly, when the screw's motion is reversed as in Figure 23, the bushing 277 and clip 278 are rocked to the right until the left leg 280 of the clip encounters the guide rod 236.

The lower extremity of the clip 278 is formed as a downwardly directed cam 281. The hinge rockers 282 and 283 carrying the recording and erasing heads 266 and 267 have short inward extensions or levers 284 and 285 lying side-by-side under the clip. In the normal forward or operating position shown in Figure 22 the cam 281 clears both levers 284 and 285, so that the heads 266 and 267 are free to operatively engage the drum surface 241 as previously described. However, when the device is reversed as shown in Figure 23, the cam 281 depresses the levers 284 and 285, thus raising and holding the heads 266 and 267 clear of the drum surface 241 as they traverse the latter during return of the apparatus to normal position.

In addition to the above-described raising of the operating heads during the reset, the combination of the split bushing 277 and clip 278 performs two other functions. First it supplies a light braking effect to prevent unduly rapid resetting drive by the torsion spring 273. Secondly, as the bushing 277 is impregnated with oil, it supplies a thin film thereof to the threads of the screw 247 at all times, eliminating the necessity for any additional lubricating means between the screw and the nut 263.

*Mid-cycle timing mechanism*

Referring to Figures 2 and 4, the numeral 286 indicates a short vertical shaft journalled in a bushing 287 set in the chassis plate 38. A pulley 288, secured on the lower end of the shaft 286, has wound thereon a steel tape 289, the free end of the tape being fastened to the guide lug 264 by means of screws 290 as shown in detail Figure 24. A torsion spring 291, fastened to the pulley 288 and the chassis plate 38, maintains the tape 289 taut between the pulley and the lug 264. It will be evident that as the lug 264 moves rearwardly during the feeding operation previously described the tape 289 revolves the pulley 288 and its shaft 286 counter-clockwise as viewed from the top in Figure 24, while as the lug 264 moves outward during re-wind the spring 291 revolves the pulley and shaft clockwise to initial position.

The upper end of the shaft 286 has secured on the upper end thereof a radial bracket 292 to which is horizontally pivoted a contact rocker 293, Figures 2, 4 and 25. This rocker has a downwardly depending tab 294 near its outer end, as shown in Figure 4, and a horizontal tab 295 overlying the upper end of the shaft 286, Figure 25. A circular plate 296, rotatably mounted on the shaft 286 below the bracket 292, has therein a pin 297 adapted to engage the tab 294 as illustrated in Figure 27. A light spiral spring 298, Figures 25, 26 and 28, normally holds the plate 296 with its pin 297 against a stationary stop 299, the pin 297 in this position being just clear of the tab 294.

A bracket 300 secured to the plate 38, Figures 4 and 5, carries an electro-magnet 301 provided with a spring-pressed armature 302 terminating in a latching toe 303. When the magnet 301 is de-energized, the toe 303 presses downward against the rim of the disc 296, pinching the latter between the toe and an underlying shoe 304. By this means the disc 296 is normally locked in whatever position it occupied at the instant the magnet 301 was last de-energized; similarly, energizing the magnet raises the toe 303, unlatching the disc 296 to permit rotation thereof.

A bracket 305 supports a snap-switch 306, hereinafter referred to as the mid-cycle switch, having its spring-pressed operating plunger 307 overlying the rocker-tab 295.

During recording on the drum 240, the release magnet 301 is energized by means hereinafter explained in connection with the electrical diagram, Figure 20, so that the disc 296 is initially urged by the light spiral spring 298 into the normal position shown in Figures 2 and 25. As the feed advance of the lug 264 rotates the shaft 286 as previously set forth, the vertical tab 294 of the radial rocker 293 is carried against the pin 297 in the disc 296. The resistance of the spiral spring 298 to movement of the pin 297 causes the horizontal tab 295 to be rocked against the switch plunger 307. However, the strength of the spring 298 is less than the comparatively heavy resilient resisting pressure of the plunger 307, so that the latter is not actuated, the tab 294 instead moving the pin 297 and disc 296 clockwise as a unit with the assembly of the bracket 292 and rocker 293.

As recording is completed the magnet 301 is de-energized (also by means hereinafter set forth), thus locking the disc 296 to stop any further movement of the pin 297. Thereupon the positive resistance of the pin 297 against the rocker tab 294 causes further counter-clockwise rotation of the rocker 293 to thrust the horizontal tab 295 powerfully upward as illustrated in Figure 27, thus actuating the switch 306.

When upon completion of recording the return of the described recorder feed mechanism returns the bracket 292 to normal position, the magnet 301 remains de-energized, so that the disc 296 remains locked with the pin 297 in the advanced position in which it was locked, as shown in Figure 28. The pin is held in this position thereafter throughout all subsequent reproduction of the recording, not being released until a new recording is to be made. Therefore, during each subsequent playing out or "talk-out" of the recording, the advance of the feed mechanism swings the bracket 292 counter-clockwise until the rocker tab 294 encounters the pin 297 in the latter's fixed advance position, thereby actuating the switch 306 in accordance with the pin's position.

From the foregoing, it will be evident that whatever the length of any recording made as described, the mid-cycle switch 306 is always thrown immediately at the end of each reproduction thereof, since the setting of the actuating mechanism is automatically determined in each case by the duration of the particular recording operation itself. A second snap-switch 308, Figures 4 and 20, is so mounted as to be actuated by the radial bracket 292 only in the latter's normal or home position.

A stationary stop 439, secured to the plate 38, is adapted to engage the pin 297 and thus throw the switch 306 just prior to the end of the possible travel of the described feed mechanism, thus acting as a safety or limit stop in case the operator attempts to operate the recording mechanism beyond the latter's capacity.

*Set-up switch*

Manual set-up to establish circuit for the various operations of talk-out recording, testing the talk-out, automatic answering and message recording, and message play-back is provided by means of a four-unit gong switch 309, preferably of a type known as the "Oak Switch," produced by the Oak Manufacturing Company, and having the general mechanical structure shown in Figure 15. Referring to the latter figure, a frame 310, attached to the lower side of the chassis plate 38, has vertically slidable therein four flat rods 311, 312, 313 and 314, surmounted by buttons 315, 316, 317 and 318, respectively, and urged upward by springs 319.

A common longitudinal spring-pressed latching bar 320 is provided with the usual type inclined releasing and retaining members 321 cooperative with the rods 312, 313, and 314, but in the present embodiment the releasing member 322 operative by the rod 311 is not provided with a retaining notch. It will be evident, therefore, that while depression of any of the four switch-rods will slide the bar 320 to the right to release any other rod which may be latched in downward position, only the rear three rods 312, 313 and 314 can themselves be automatically retained in depressed position. In other words, while rods 312, 313 and 314 are automatically locking, the rod 311 returns upward as manual pressure is released therefrom, in the manner usually referred to as "momentary contact" switching.

The switch rods are preferably provided with an underlying set of slidable interlock slugs 323 proportioned and nested in their retaining casing 324 in a well known manner so as to prevent the depression of more than one switch rod into operative position at the same time.

A solenoid 325, mounted on the plate 38 and linked to the bar 320 through a lever 326, is adapted when energized to move the bar 320 to the right (Figure 15), thus providing for electrical release of any previously latched switching rod without requiring depression of any other rod.

As the physical structure of the switch contacts common to switches of the general type illustrated and their manner of assembly relative to their respective actuating rods are well known in the art, the illustration of these contacts is confined to the schematic electrical diagram, Figure 20, in order to avoid unnecessary complication of the mechanical drawings.

The push-buttons 315, 316, 317 and 318, protrude upward through the casing 178 near the right front corner thereof, Figure 1, the casing carrying legends adjacent the buttons identifying their functions as shown. For simplicity and clarity in subsequent explanation in connection with the electrical diagram, the individual switch assemblies associated with the various buttons will hereinafter be generally referred to in terms of their respective buttons themselves, that is, as the "record switch 315," the "test switch 316," the "automatic switch 317," and the "play-back switch 318."

*Electrical connections*

Referring to Figure 20, the numerals 327 and 328 designate two conductors of a telephone line leading from a central station to a subscriber's telephone 329. In applying the present invention, two taps 330 and 331 are applied to the telephone conductors 327 and 328.

A ringing relay 332 is connected across the taps 330 and 331 via a suitable condenser 333. A second line pair 527—528 from the telephone central office connects to internal conductors 529 and 530. A second ringing relay 531 is connected across the conductors 529 and 530 through a condenser 532.

The outer winding 334 of a repeating coil or isolation transformer 335 is connected on one side via a conductor 336 to a normally open contactor 337 on the "automatic" switch 317. From the contactor 337 a wire 338 connects to one side of a normally open contactor 339 on a relay 340, the other side of the latter contactor 339 being connected to the tap 330. The other terminal 334a of the outer winding 334 has two alternative circuit connections. One of these is via a lead 600, a branch 601 thereof, and a normally open contact 403 on the relay 340 to the internal line conductor 331.

From the above description it will be evident that if the "automatic" switch 317 has been depressed to close the contactor 337, actuation of the relay 340 throws the repeating coil winding 334 across the telephone line 327—328.

The second of the alternative circuit connections of the outer repeating coil terminal 334a is via the lead 600 to a normally open contact 603 on a relay 526, Figure 20*a*, hereinafter further described, thence to the internal line conductor 529.

The inner winding 341 of the repeating coil 335, grounded at one end, has its other end connected via a lead 342 with one side of a normally open contactor 343 on the "automatic" switch 317. From the other side of contactor 343 a wire 344 connects via a normally closed contact 345 (forming part of a timer 346 to be hereinafter described), thence via a wire 347 to the common electrode of a double-throw contactor 348 of a relay 349, hereinafter termed the mid-cycle relay. The normally closed point 350 of contactor 348 is connected through conductors 351 and 352 to the main output terminal 353 of an amplifier 354, while the normally open point 355 is connected through conductors 356 and 357 to the main input terminal 358 of the amplifier. A branch 360 from the conductor 351 connects to a normally open contactor 361 on the relay 349, thence to the embossing or recording head 68 via a lead 454.

By the described arrangement it will be seen that with the "automatic" switch 317 depressed, the inner winding 341 is normally connected to the output 353 of the amplifier, but when the mid-cycle relay 349 is actuated the winding 341 is switched from the amplifier output 353 to the input 358, while at the same time the output 353 is connected to the recorder head 68.

The amplifier 354 represents an electronic combination of a dual type having a second output 362 and input 363 suitable for cooperation with the magnetic recording head 266, high-frequency supply terminals 364 and 365, a microphone input terminal 366, and a low voltage D. C. supply to terminal 367. Since the specific structures of electronic combinations adapted to provide the above facilities are well known and form per se no part of the present invention, no detail description thereof is necessary herein, except to note that the arrangement of filament and main power to the amplifier tubes may be generally that shown in co-pending application Serial No. 277,754, filed March 21, 1952, wherein heating current is supplied to the filaments at all times when the amplifier is connected, but wherein main power to the tubes is supplied or withheld by switching between external leads from the amplifier. In the present case the numerals 415 and 416 represent these power circuit leads, which may be connected by closing a normally open pair of contacts 417 on the relay 340, via branches 418 and 419 by closure of a normally open pair of contacts 420 on the telephone hookswitch 377 hereinafter further described, or by closure of a normally open contact pair 525 on the relay 526, hereinafter termed the "answer-back relay."

Operating current for the entire device is furnished through a pair of main conductors 368 and 369 connected to a supply source of suitable alternating current for example 60 cycle, 110 v. In following out the diagram, Figure 20, it will be noted that all switching takes place on the side of the line associated with the conductor 368, the conductor 369 comprising a return line to which all associated magnets, motors, etc., are solidly connected, as for instance by the return lead 370 from the motor 47.

Therefore, since as stated and as shown in the diagram, all returns from the various associated elements are simple solid connections performing the same function in the same well-known way, detailed individual tracing thereof is unnecessary and is hereinafter largely omitted for purposes of brevity and avoidance of undue multiplicity of index numbers.

The conductor 368 is connected to the normally closed flap-switch 373, from which the supply line connects through conductor 378 to a normally closed contact pair 379 on a relay 380. A return wire 381 from the contact pair 379 divides into two branches 384 and 402. A tap 382 from the wire 381 runs to a common double-throw contact member 383 of the hookswitch 377.

The current supply conductor branch 384 in turn divides into three branches. The first branch 385 connects to two parallel normally open contacts 386 and 387 of the "automatic" switch 317. The second branch 388 runs to a normally closed breaker 389 on the timer 346. The third branch 390 connects to one side of a normally open contact 391 of a relay 392, termed the plate relay, the other side of the contact 391 being connected to a conductor 393, termed the inner supply conductor.

The coil 394 of the plate relay 392 is connected via leads 395 and 396 into the plate circuit of the amplifier 354, so that closure of the relay 392 cannot occur until proper plate voltage is present. When the amplifier 354 is energized in a cold state, the inner supply conductor 393 remains dead until the tubes are properly warmed up, whereupon closure of the plate relay 392 connects the inner conductor through the previously described intermediate elements to the main supply conductor 368.

Energizing current is supplied to the amplifier 354 through either of two alternative paths; first, by raising the hand-set 199 to release the hook-switch 377, a circuit is completed via the previously noted branch 382 and common switch electrode 383 to the upper or normally disengaged switch point 397, thence via wires 398, 399, and 400, to the amplifier. The second path is established by depressing the "automatic" switch 317, which connects the supply branch 385 directly through the previously mentioned contact 387 with the A. C. input wire 400.

The relay 340 is adapted to receive energizing current through a conductor 404 which is connected via a normally closed pole 405 of the timer "home" switch 308 and a wire 406 to normally open contacts 407, 408 on the "record" and "test" switches 315 and 316, respectively. From the opposite sides of the "record" and 'test" contactors a common wire 410 forms a connection to a normally open contact pair 411 on the hook-switch 377. From the latter contact pair 411 a connection normally exists via a wire 412, a branch 413, and the normally closed back contact 414 of the mid-cycle switch 306 to the inner supply conductor 393.

From the described connections it will be ascertained that, providing the amplifier is operatively warmed and the inner supply conductor 393 charged as previously explained, depression of either the "record" switch 315 or "test" switch 316 energizes the "starting" or main relay 340. It will be further noted, however, that to establish the initial conditions necessary for such operation the hand-set 199 must be off the hook-switch 377, so that the latter's contacts 383—397 and 420 may respectively close the main current supply circuit to the amplifier and the amplifier's own power circuit as previously traced.

When the "automatic" switch 317 is in depressed or operative position (at which time both the previously described contacts 407 and 408 are necessarily open) initial operation of the starting relay 340 may be effected under control of the ringing relay 332, which carries a normally open pair of contacts 421. When the relay 332 is energized by ringing current from the telephone line conductors 327 and 328 via the condenser 333, a circuit is closed from the current supply branch 402 via a second normally closed pair of contacts 423 on the drum feed reset "homing" switch 308, and a wire 424 to the closed contacts 409 of the "automatic" switch 317, thence through a wire 532, a normally closed contact 533 of the "answer-back" relay 526, a wire 534, a normally closed contact 535 on the main relay 340, a conductor 536, the ringing relay contacts 421, a lead 537 and the normally closed limit switch 371 to one magnet coil 538 of a two-magnet relay 539, the second magnet coil being indicated by the numeral 540. The relay 539 has a common contact armature 541 operable by either of the two magnets in opposite directions, this common contact member being connected via a branch 542 to the conductor 424, thence as previously traced through the normally closed contact 423 and the branches 422 and 402 to the supply conductor 381. When the magnet 538 is energized as noted, the common electrode 541 engages a contact point 543 connected via a lead 544 to the main relay 340, thus energizing the latter. It will thus be seen that with "automatic" set-up, ringing current through the ringing relay 382 causes the main relay 340 to be actuated.

It will be noted that the second coil 540 of the relay 539 is connected via a wire 545 with one side of a normally open contact pair 546 on the second ringing relay 531, the other side of the contact combination being connected through a branch 547 to the conductor 536. By this arrangement, with the "automatic" switching set-up as described, if the second ringing relay 531 receives ringing current through the second line pair 527—528, closure of the contact 546 energizes the second magnet 540 of the relay 539 instead of the opposed first magnet 538. The common electrode 541 thereby is drawn into engagement with a second contact point 548 to direct energizing current through a wire 549 to the "answer-back" relay 526.

From the foregoing it will be evident that the double-magnet relay 539 acts as a monitor, directing actuating current either to the main relay 340 or the answer-back relay 526 in accordance with whether the calling ring comes in over the telephone line pair 327—328 or the second line pair 527—528. This monitor relay is preferably constructed to provide a short time delay action both in make and break, for example by the use of a substantial inertia mass in the armature or common electrode member 541. The time delay on "make" allows the use of extremely sensitive ringing relays while at the same time preventing accidental starting of the machine by short impulses known as "transients" coming in on either telephone line. Similarly, the time delay on "break" provides ample time for the complete closure of the main relay 340 on answer-back relay 526. Both these latter relays are provided with holding circuits as hereinafter described, but as the current supply to the monitor relay 539 comes through previously described normally closed main and answer-back relay contacts 535 and 533 in series, operation of either de-energizes the monitor relay by which the initial actuating current is being directed. The time lag in "break" of the monitor relay maintains this initial current to whichever of the two relays it has selected until closure of the latter's holding circuit is assured. It will be evident that this provision eliminates the necessity for delicate "make before break" adjustment among the contacts of the relays 340 and 526.

In "automatic" or answering setting of the switch as noted, the described actuation of the starting relay 340 establishes the following circuit connections:

(*a*) Closure of the amplifier power circuit between leads 415 and 416 through the relay contacts 417, thus causing the plate relay 392 to be energized as previously noted.

(*b*) A holding circuit for the relay 340 via the conductor 388, the normally closed timer contact 389, a conductor 425, a normally closed contact 426 of a double-throw manual switch 427, a conductor 428, a lower contact 429 and co-operative switch-arm 430 on the "automatic" switch 317, a conductor 431, and a contact 432 on the relay 340 to the conductor 404. By this circuit, when the initial energizing current is terminated as previously noted, the relay 340 remains energized.

(*c*) A circuit from the inner main supply conductor 393 via a relay contact 433 and a wire 434 to the feed trip magnet 259; also via a branch 435 from wire 434, a double-throw switch arm 436 on the mid-cycle relay 349 and the normally closed contact 437 thereof, and a conductor 438 to the "talk-out" motor 246. By these circuits closure of the relay 340 starts the motor 246 and engages the previously described feed mechanism for the magnetic drum 240.

(*d*) The previously described connection via relay contact 403 between the outer repeating coil winding 334 and the telephone line conductor 331.

(*e*) A circuit from the inner telephone line conductor 330 via the previously noted relay contact 339, conductor 338, "automatic" switch contact 337, lead 336 and the outer repeating coil winding 334 to the telephone line conductor 331.

(*f*) A circuit from the "magnetic" input connection 363 of the amplifier 354 through a lead 440, a relay contact 441, a wire 442, a normally closed contact 443 and its cooperative switch arm 444 on the "record" switch 315, and a wire 445 to the magnetic reproducing and recording head 266.

(*g*) The possible supply circuit to the monitor relay 539 is broken at the contact 535 as previously noted.

The mid-cycle switch 306, adapted to be operated by the means previously described in connection with Figures 2, 4 and 24–28, has a normally open contact point 446 connected via a wire 447 to a contactor 448 on the "automatic" switch 317, from which a connection normally exists through a wire 449, a second closed contact 450 in the manual switch 427, and a wire 451 to the coil 452 of the mid-cycle relay 349. Since in automatic answering set-up position the contact 448 is closed, it will be evident that actuation of the mid-cycle switch 306 energizes the mid-cycle relay 349 from the inner main supply conductor 393 through the described connection.

Actuation of the mid-cycle relay effects the following:

(*a*) The contact arm 348, which is connected via previously traced means to the inner repeating coil winding 341, breaks its contact 350 and makes contact on 355, thereby disconnecting the repeating coil winding from the amplifier output 353 and connecting it instead to the input 358.

(*b*) The contactor 361, connected to the conductor 351 by the branch 360, completes a connection via a lead 454 from the embossing head 68 to the amplifier output 353.

(*c*) The contact arm 436 breaks with contact 437, thereby stopping the "talk-out" motor 246, and engages a second contact 456 connected via wires 457 and 458 to the second or message-recording motor 47, thus starting the latter.

(*d*) A fourth relay contact point 459, connected via a lead 460 to the timer-motor 461, is engaged by an electrode 462 connected to a branch 463 of the wire 457, thereby starting the timer cycle.

The timer 346 includes a cam 464 adapted to open the previously described contact 389 in the holding circuit of the main or starting relay 340 after a predetermined length of time, thereby limiting the incoming message recording time as hereinafter set forth. A second rotary timer cam 465 has lobes 466 and 467 adapted to effect momentary operation of a double-pole switch 468, this switch being provided to control a signal or "beep" tone generator 469, preferable of the general type described and claimed in co-pending application Serial No. 280,046, filed April 2, 1952. For purposes of the present illustration, this generator includes a toothed steel or iron wheel 470 mounted on the shaft of the drive motor 47, and a stationary core 471 mounted closely adjacent the periphery of the wheel 470, this core carrying an exciter winding 472 and a secondary or output winding 473.

The switch 468 includes a normally open contactor 474 adapted when closed to connect the winding 472 via a conductor 475 to the low voltage D. C. terminal 367 of the amplifier 354. A second movable electrode 476 on the switch 468, connected to the conductor 344 and thence by previously traced connections to the repeater coil winding 341, normally engages the contact 345 leading to the amplifier input 358 when the mid-cycle relay 349 is closed. When the switch 468 is actuated, the electrode 476 disengages the contact 345 and engages a second contact 477 connected to the output winding 473.

When the motor 47 is in operation and the exciter winding 472 disconnected, the rapid peripheral motion of the toothed wheel 470 past the core 471 produces no effect, as the core is dead. However, when the cam 465 actuates the switch 468 the exciter winding 472 is charged to magnetize the core, so that the rapid successive magnetic fluctuation caused by passage of the wheel teeth past the core induce an alternating current in the output winding 473 of frequency determined by the speed of the motor and the number of teeth on the wheel. This current is transmitted via the switch 468 and related described connections to the inner repeating coil winding 341, causing the outer winding 334 to impress a signal tone on the telephone line. The duration of the tone is preferably very short, for example in the order of a fraction of a second, as determined by the contour of the timer cam lobes 466 and 467.

Depression of the "record" switch 315 effects the following circuit connections, assuming the hand-set 199 to have been previously removed from the hook-switch 377:

(*a*) A current supply connection is completed via the contact 407 and previously traced elements to the main relay 340 to close the latter, thereby starting the motor 246 and actuating the feed trip 259. (It will be noted that removal of the handset 199 has already directed A. C. supply current to the amplifier 354 via hook-switch contact 397 and has closed the amplifier power circuit via hook-switch contact 420, so that the plate relay 392 closes as soon as the tubes heat up.)

(*b*) A circuit connection is completed by a "record" switch contact 478 through the hook-switch contact 397, the conductor 398, and a wire 479 to the record timer release magnet 301, thus permitting the timer disk 296 (Figures 25–28) to reset to zero.

(*c*) A contact 480 connects the transmitter or microphone 481 of the handset 199 via wires 482 and 483 to the telephone input terminal 366 of the amplifier 354. (Low voltage D. C. meanwhile is supplied to the transmitter via conductor 475, a hook-switch contact 484 and a lead 485.)

(*d*) The switch electrode 444 disengages its contact point 443 and engages a contact point 486, thus disconnecting the magnetic recorder head 266 from the input 363 and connecting it to the output 362 via a lead 487.

(*e*) A contactor 488 connects the magnetic erase head 267 to the high-frequency terminals 365 and 364 via leads 489, 490 and 491.

(*f*) A contact 502 forms a connection between a wire 503 leading to green, yellow and red signal lamps 504, 505 and 506, and a conductor 507 connected to one side of the low-voltage secondary winding 508 of a transformer 509, the other side of the winding being grounded. The lamps 504, 505 and 506 are respectively connected to insulated arcuate contact shoes 510, 511 and 512 arranged about the timer shaft 286 carrying the pulley 288, Figure 24. A brush 513 on the pulley 288 is adapted to engage the shoes 510, 511 and 512, thus establishing successive ground connections for the corresponding lamps, and as the transformer winding 508 is also grounded as shown, the lamps are successively illuminated as the brush 513 rotates during recording. The shoes are so proportioned and arranged that the green lamp 504 is lighted immediately after the start of the feed mechanism and is kept lighted throughout the greater part of the available recording time. As the remaining time grows short the yellow light 505 is lighted. Finally, just prior to the extreme end of the available recording time the red lamp 506 is illuminated. From the foregoing it will be seen that the green, yellow and red lamps operate as "go," "warning" and "stop" signals after the manner of vehicular traffic signals, a system familiar to the average individual and readily used by him in regulating the length of his recorded "talk-out" message.

Actuation of the "test" switch 316, assuming the handset to be off the hook-switch as before, affects the following:

(*a*) Closure of the contact 408 energizes the main relay 340 as previously set forth.

(*b*) A contact 492 connects the amplifier output conductor 352 via a conductor 493 and cord lead 494 to the hand-set receiver 495.

(*c*) A contact 496 and a lead 497 connect the switch release solenoid 325 through a branch 498 and the conductor 447 to the normally open contact 446 of the mid-cycle switch 306. By this connection it wil be evident that the actuation of the mid-cycle switch 306 energizes the solenoid 325 to release the "test" switch 316 and allow the latter to return to normal position as shown.

(*d*) A contact 499 also connects the solenoid lead 497 to a conductor 500 connected to a contact point 501 adapted to be engaged by the hook-switch electrode 383 when the hook-switch is depressed as shown. By this arrangement it will be evident that whenever the hand-set 199 is "hung up" the solenoid 325 is actuated to unlatch and release the "test" switch 316, so that the latter can be latched in actuated position only if the hand-set is off its cradle.

Depression of the "automatic" switch 317 effects the following, assuming the hand-set 199 to be in place as shown:

(a) Closure of the contact 337 sets up the device for operative connection thereof to the telephone line via the repeating coil 335 when the main relay 340 is actuated by operation of the ringing relay 332, as previously described and traced in circuit detail.

(b) Closure of contact 343 connects the inner repeating coil winding 341 initially to the amplifier output 353 via the normally closed signal generator contact 345 and related conductors previously traced in detail.

(c) Closure of the contact 409 sets up the control circuit to the relay 340 for initial actuation by the ringing relay 332, also as previously traced.

(d) Closure of the contact arm 430 on its lower contact point 429 places the previously described holding circuit of the main relay 340 under control of the message timer 346 via the timer contact 389.

(e) Closure of contact 448 connects the mid-cycle relay coil 452 via previously traced elements to the normally open contact 446 of the mid-cycle switch 306.

(f) Closure of contact 387 directs current supply to the amplifier via previously noted conductors 385 and 400.

(g) A contact 514 is adapted to connect the release trip solenoid lead 497 to the conductor 398 leading to the normally open contact 397 on the hook-switch 377. It will be evident that by this arrangement, if the hand-set 199 is not in place on the hook-switch, so that the contact 397 is engaged by its movable electrode 383, depression of the "automatic" switch 317 immediately energizes the release solenoid 325. Thus it is impossible to latch the "automatic" switch in operative position unless the hook-switch is in depressed position as shown, that is normally unless the hand-set is properly on its cradle.

(h) Closure of the contact 386 directs current via a conductor 515 to the movable electrodes 516 and 517 of a double-pole switch combination 518. This switch 518 is secured to the chassis plate 38 as shown in Figure 5, in such position that when the recorder lift slider or bar 91 is in normal forward position (that is with the recorder head mechanism elevated), the bar holds the switch electrodes 516 and 517 in engagement respectively with contact points 519 and 520. Point 419 is connected via a branch 521 and the lead 458 to the turn-table motor 47, while point 520 is connected through a normally closed breaker 455 (hereinafter further described) to the embosser trip magnet 119 (Figure 5) and the play-back stop release magnet 170 (Figures 18 and 19). Thus initial closure of the "automatic" switch contact 386 starts the motor 47 and actuates the recorder trip magnet 119 to start the single-revolution cycle of the cam 97 and thrust collar 98 as previously explained in connection with Figures 5 and 8–13, at the same time actuating the pick-up stop release magnet 170 also as previously explained.

During the first portion of the noted single-revolution cycle the previously explained leftward movement of the lead screw shaft 53 causes the fork lever 120 to close one contact pair 522 of a double-pole snap switch 523, Figures 5 and 8, at the same time opening the second contact pair 524 thereof. Closure of the contact 522 establishes a connection parallel to that of the normally engaged electrode 516 and its contact point 519. Thereafter, as the bar 91 is drawn rearwardly (Figures 5 and 8) to lower the recorder mechanism, the switch 518 is permitted to open both its sets of contacts. The trip magnet 119 and stop release magnet 170 are thereby de-energized immediately, but the above-noted parallel connection through contact 522 maintains the motor 47 in operation until return of the lead-screw shaft to its initial position at the end of the single-revolution cycle allows the contact 522 to open and the motor consequently to stop.

Again assuming the hand-set 199 to have been removed from the hook-switch 377, depression of the "play-back" switch 318 effects the following:

(a) A contact 550 connects the conductor 500 to the switch release solenoid lead 497, so that the switch 318 can be locked down only if the hand-set 199 is "off the hook" as previously explained respecting the test switch 316.

(b) A contact 551 closes a connection from the hand-set receiver 495 via lead 494, conductor 493, branches 552 and 553, and the conductor 352 to the amplifier output 353.

(c) A contact 554 connects the inner supply conductor 393 via the conductor 458 to the motor 47, thus starting the latter.

(d) A contact 555 closes a connection via a lead 556 and the conductor 357 from the reproducer or pick-up 148 to the main amplifier input 358.

(e) A contact 557 completes a current-supply connection from the conductor 399 via a wire 558 to the normally closed contact 524 of the switch 523, thence via a lead 559 to the pick-up trip magnet 114. It will be evident that this circuit trips the rocker 110, Figures 5, 8, 9 and 11, allowing the previously described pick-up control mechanism to perform its first half-cycle, moving the pick-up 148 outward until it is restrained by the stop tab 160, Figure 14, then lowering the pick-up on the record 85 to reproduce the recordings thereon via the receiver 495.

A movable switch electrode 560, so located as to be operable by the pick-up arm 145 when the pick-up is moved to the extreme inner zone of the record 85 in contact therewith, is adapted when so operated to engage a contact point 561 connected to the supply conductor branch 382. The electrode 560 is connected via a wire 562 to the conductor 500. Thus, after the pick-up has traversed the recorded zone it is swung inward across the remaining unrecorded zone in the manner fully set forth in my co-pending application Serial No. 239,773, filed August 1, 1951, until it encounters and closes the electrode 560 on the point 561, directing current via conductor 500, closed contact 550 and lead 497 to the switch release solenoid 325. Operation of the solenoid immediately releases the switch 318, returning all its contacts to normal as shown in Figure 20, thus breaking all their previously described circuit connections. The pick-up trip 114 being de-energized, the clutch pawl 106 reengages the ratchet 103, Figure 11, to complete the pick-up's control cycle as previously described. However, as the switch contact 554 has been opened by release of the main play-back switch 318, other means must be employed to keep the motor 47 running until the cycle is completed.

To provide such means a switch 563 is so mounted as to be held open by the pick-up shifting rod 134 only when the latter is in normal position. When the described control cycle starts, withdrawal of the rod 134 permits the switch to close a connection between the motor 47 via conductors 458, 521, 564 and 565 to the main A. C. supply conductor 368. This sets up a holding circuit which persists until the rod 134 returns to normal stop position to re-open the switch 563. It will thus be seen that once the play-back control cycle is started it will always be completed to carry the pick-up to normal position irrespective of any changes in the main switching set-up.

As illustrated in Figure 2, the breaker 560 is so located that it cannot be engaged by the arm 145 when the latter is in normally elevated position.

Should it be desired to terminate play-back before the entire recording has been reproduced, this may be accomplished simply by hanging up the hand-set, thereby energizing the solenoid 325 to release the switch 318 as previously explained.

The previously mentioned breaker switch 455 in the circuit of the embosser trip magnet 119 is controlled by the periphery of the flange 102 on the pick-up control shaft 100, as shown diagrammatically in Figure 20*a*. The flange is notched to allow the breaker 455 to remain closed only when the pick-up control assembly is in normal position. As soon as the flange 102 starts to revolve during the reproducing control cycle, the breaker 455 is opened and so remains until the cycle is complete, thus disabling the magnets 119 and 170 during this cycle. Similarly, opening of the previously described contact 524 of the switch 523 disables the pick-up trip magnet 114 while the recorder or embosser control cycle is in process. It will be evident that these provisions prevent any accidental simultaneous operation of and consequent interference between the recorder and pick-up control cycles as a result of quick successive operation of the related manual switching means.

The connections and purpose of the previously mentioned safety relay 380, Figure 20*a*, are as follows: The conductor 507 connects one terminal 567 of the coil 568 of the relay 380 to the secondary winding 508 of the stand-by transformer 509, this secondary as previously noted being wound for a low voltage of the order of 6 volts. The primary winding 569 of the transformer 509 is solidly connected via the conductor 565 and a wire 570 across the main A. C. supply conductors 368 and 369, so that this transformer primary remains energized after the manner of a bell transformer so long as the device is connected to a source of current.

The second terminal 571 of the relay coil 568 is connected via means described in connection with Figure 2 to the cup 222 which normally holds down the recording disk 85. The disk 85 is made of suitable insulating material such as vinylite, and thus acts as an insulator between the cup 222 and the grounded spring contacts 231, so that if a record disk is in place the relay coil 568 has no ground connection and thus remains deenergized. If, however, the cup 222 is lowered in to place by closure of the flap 176, Figure 2, when no record disk 85 is in place on the turn-table 44, the cup 222 engages the contacts 231, thus completing the ground circuit connection of the relay coil 568. The relay 380 is thereby actuated, opening the contact 379 to disable all A.-C. current supply to the major elements of the machine. Thus the machine cannot be set up and caused to perform any of its normal operations if the user neglects to place a record disk on the turn-table. At the same time, a second contactor 572 on the relay 380 energizes a buzzer 573 and/or an alarm lamp 574 to inform the user of his neglect in order that he may remedy it at once.

It will be seen from the foregoing that the safety relay 380 and its described related connections provide a complete safe-guard against accidental injury to the embossing stylus, pick-up and turn-table by failure to replace a record disk, for, since no manual means exists by which the embosser and pick-up can be lowered to the turn-table, disabling the power supply renders it impossible to lower them at all.

Referring to the plate relay 392, Figure 20, in addition to the previously described main contact 391, this relay includes a normally closed contact pair 575 and a double-throw switch arm 576, the latter normally engaging a contact point 577 and adapted to switch to a second point 578 when the relay operates. The normally closed contact pair 575 is connected on one side via a branch 579 and the conductor 507 to the lower voltage secondary 508 of the stand-by transformer 509. From the other side of the contact pair 575 an electrical connection is made via a conductor 580, a condenser 581 and a resistor 582, to a normally open contactor 583 of the hook-switch 377, from which latter a cord conductor 584 leads to the receiver 495. A return lead 585 from the receiver 495 normally connects to the double-throw switch arm 576, thence via the normally engaged point 577 to ground 586. By these connections, if the amplifier 354 is cold, when the hand-set 199 is raised low-voltage 60-cycle A.-C. is impressed on the receiver 495, generating an audible tone therein which persists until the amplifier warms up, whereupon operation of the plate relay 392 opens the contact pair 575 to cut off the A.-C. from the receiver and thereby terminates the tone. At the same time the switch arm 576 shifts the receiver's ground connection from ordinary A.-C. ground 586 to amplifier or "chassis" ground 587 via the point 578, thereby providing the receiver with the proper ground connection for use in the play-back or the testing operations.

The above-described A.-C. tone in the receiver 495 operates as an audible warning to the user that the amplifier is not warmed to operating condition. This audible warning is of use particularly in preventing premature speaking when starting to record a talk-out message. It thus augments the signal light 504 for this purpose, and renders premature speaking with a cold amplifier much more unlikely, for while certain users may tend to forget and ignore the requirement for the visual signal, it is practically impossible to ignore the audible signal in the hand-set which is to be used for recording.

A small normally open switch 588, Figure 20*a*, is adapted to close a low-voltage connection through a signal lamp 589. The switch 588 is disposed as shown in Figure 5 and is arranged to be closed by the recorder carriage 59 a short space in advance of the limit switch 371. This provision turns on the light 589 when the recording has progressed to within a few messages of the record capacity, thus notifying the user that the record will shortly be exhausted.

The foregoing description has covered the major electrical connections of the device with the exception of four additional normally open contactors 590, 591, 592 and 603, on the answer-back relay 526. The functions and connections of these contactors are as follows:

When the relay 526 is energized by the momentary current via conductor 549 from the monitor relay 539, the contactor 590 closes a second circuit to the answer-back relay coil via a normally closed back contact point 593 on the pick-up breaker electrode 560, the conductor 562, the hook-switch contacts 501 and 383, and the conductor 382 from the supply conductor 381. This sets up a holding circuit which normally holds the relay 526 in operation until the breaker 560 is actuated by the pick-up at the end of the latter's "run-in" after traversing the recording, as previously set forth.

The contactor 591 closes a connection via branches 594 and 595 and the conductor 357 from the pick-up 148 to the amplifier input 358.

The contactor 592 connects the inner telephone line conductor 530 via a conductor 596, the "automatic" switch contact 337, and the conductor 336 to the outer repeating coil winding 334.

The contact pair 603 connects the inner line conductor 529 to the terminal 334*a* of the outer repeating coil winding 334 via the wire 600.

In the foregoing complete description of all essential electrical connections, the detail interlocking and coaction among and between circuit elements has rendered it impractical to follow the various prime operations of the device in complete separation from the others. For purposes of clarity, therefore, the normal separate general operations are hereinafter set forth largely in terms of function, the precise circuit means by which the successive functions are brought about having already been traced in detail, as noted.

Assuming the device to have been connected to the telephone lines and source of local current, and a record blank to be in place on the turn-table, the normal operations of the machine are as follows:

*Recording talk-out message*

The operator raises the hand-set 199, waits until termination of the A.-C. tone signal therein, then depresses the "record" switch 315. This throws in the main relay 340, connects the magnetic recording head 266 to its amplifier output, directs high frequency current through the erasing head 267, connects the transmitter 481 to the amplifier's microphone input 366, starts the motor 246, trips the drum feed by energizing its magnet 259, and releases the mid-cycle timing latch 301 to reset the disk 296 (Figures 25–28) to its normal position and condition it to be moved to a new setting.

As the feed starts the green signal lamp 504 lights up, and the operator speaks his desired talk-out message into the transmitter 481. The message is recorded helically on the magnetic drum surface 241, the erasing head 267 meanwhile operating just ahead of the recording head 266 to erase any previously recorded message.

When the message is completed the operator releases the switch 315 and/or hangs up the hand-set 199. Either of these operations de-energizes the timing latch magnet 301, locking the disk 296 in its new position, whereupon the stop pin 297 at once causes the mid-cycle switch 306 to be actuated as fully explained in connection with Figures 25 to 28. The holding circuit of the main relay 340 is thereby broken, stopping the motor 246, releasing the feed trip 259, and generally restoring the apparatus to normal except that the mid-cycle timing apparatus retains its new operative position determined by the completion of the newly-recorded message, as previously set forth. Thus the user may record a talk-out message of any desired length within the time range of the recording drum as indicated by the signal lights 504, 505 and 506, while irrespective of the length of the message the mid-cycle timer is set to operate directly after the completion thereof.

*Talk-out testing*

For this purpose the operator raises the hand-set and depresses the "test" switch 316 which automatically latches down as previously described. This operation initiates substantially the same series of events as in talk-out recording, except that the recorder-reproducer head 266 is connected to magnetic input 363 instead of output, the receiver 495 is connected to the output 353 (the transmitter being disconnected), and neither the timer latch release 301 nor the erase head 267 is energized. The previously recorded message on the drum surface 241 is picked up by the head 266, amplified, and reproduced by the receiver 495, enabling the user to listen to and check his talk-out message. As the message is completed the mid-cycle switch 306 is thrown by its timing mechanism as previously described. However, in this case the second contact point 446 of the mid-cycle switch directs current to the main switch release solenoid 325, restoring the "test" switch 316 to normal position and terminating the operation. The operator then merely hangs up the hand-set 199, or if he wishes to hear the message again, he may push down the switch 316 and repeat the operation as described.

*Automatic answering and message recording*

For this set-up the hand-set 199 must be in place on the hook-switch 377, since otherwise solenoid 325 will not allow the "automatic" switch 317 to be locked down, as previously explained. The hand-set thus being in place, the operator simply depresses the switch 317, effecting the various connections previously listed in detail to condition the apparatus to respond to an incoming ringing current on the telephone lines 327 and 328, by actuating the main relay 340. The immediate effect of actuating the switch 317, however, is to direct current through the contact 386, conductor 515 and the switch 518 to the embosser control trip 119 and the motor 47. Thereby the motor 47 is started, revolving the turn-table 44 and lead screw shaft 53, and tripping the detent 117, Figure 8. Thereupon the thrust-collar 98 and its attached cams perform one revolution as described in connection with Figures 8, 9 and 13, lowering the recording apparatus into feed position with the embosser 68 in place on the record blank and generating the lead-in spiral 130, Figure 16. During this control cycle the switch 518, Figure 20*a*, is opened by the retraction of the elevating slide bar 91, so that the trip 119 is de-energized, but the motor 47 remains in operation until the previously described holding contact 522 of the switch 523 is broken at the end of the control cycle. Therefore the device remains quiescent pending the receipt of an incoming ring.

When ringing current is received via the lines 327, 328, closure of the ringing relay 332 operates through the monitor relay 539 to close the main relay 340, connecting the outer repeating coil winding 334 across the lines 327—328, connecting the inner winding 341 to the amplifier output, starting the talk-out motor 246 and drum 240 while actuating the feed trip 259, energizing the amplifier 354, and connecting the magnetic reproducer head 266 to its amplifier input 363. The head 266 picks up the previously recorded talk-out message, which is amplified and impressed on the lines 327—328 via the repeating coil 335 so as to be transmitted thereover to the calling party.

As the talk-out message is completed the mid-cycle timing rocker 293 throws the mid-cycle switch to close on its contact 446, thus energizing the mid-cycle relay 349. Closure of the relay 349 stops the talk-out motor 246, starts the recording motor 47 and timer motor 461, switches the connection of the repeating coil winding 341 from the amplifier output 353 to the input 358, and connects the output 353 to the embossing head 68, thus starting the incoming message recording period.

As this period starts the timer cam-lobe 466 momentarily throws the switch 478, causing the tone generator 469 to generate a "peep" signal in the manner previously described. This momentary signal is sent through the repeating coil 335 to the line 327—328, informing the calling party that the message recording period is beginning, as usually explained to him in the preceding talk-out message.

During the ensuing period, the length of which is determined by the timer cam 464, any message spoken by the calling party is impressed on the record disk 85 by the embossing head 68. A few seconds prior to expiration of the recording time the second timer cam-lobe 467 again momentarily operates the "peep" switch 468 to warn the caller that the time will shortly expire. It will be obvious that the cam 465 may be constructed to provide any desired combination of single or multiple "peep" signals.

As the recording time expires the timer cam 464 opens the contact 389. This breaks the previously described holding circuit of the main relay 340, restoring its various connections to normal or stand-by condition. The feed trip magnet 259 being de-energized, the spring 273 (Figure 2) returns the drum feed mechanism and with it the mid-cycle timer to zero position. Retraction of the timer rocker 293 allows the mid-cycle switch 306 to return to normal as shown in Figure 20, breaking the connection to the mid-cycle relay 349. By the combination of the above operations the answering and recording cycle is terminated and the machine returned to normal set-up ready to respond to the next telephone call.

If a long series of messages completely fills the record blank, the limit switch 371 is opened by the recorder carriage as previously explained so that the current connection from the contacts 421 of the ringing relay 332 to the monitor relay coil 538 is disabled. This prevents any further response of the device to subsequent rings over the line 327—328 until a fresh recording surface is provided. However, opening the limit switch 371 does not interrupt the incoming message then in progress, since the previously described holding circuit of the main relay maintains the device in operation to the end of the normal cycle. Also since the opening of the limit switch disables only the response to closure of the first ringing relay 332, it does not prevent the user from receiving all his messages via the answer-back procedure hereinafter set forth.

*Play-back*

To play back the recorded messages, the operator takes up the hand-set 199 and pushes down the "play-back" switch 318. This operation closes the amplifier power circuit, switches on the motor 47, connects the amplifier input 358 to the pick-up 148 and the output 353 to the receiver 495, and energizes the pick-up magnet 114. The detent 108, Figures 8 and 11, releases the clutch pawl 106, causing the pick-up control cam 99 to rotate one-half revolution until the pawl is disengaged from the ratchet 103 by the second detent 111. During the half revolution the cam 99 raises the related recording apparatus from the record, the rod 134 moves the pick-up arm outward until restrained by the stop toe 160, Figures 14, 16, and 17, and the cam 99 lowers the pick-up into engagement with the record in the position predetermined by the toe 160, all as previously set forth in greater mechanical detail. Thereupon the recorded messages are picked up, amplified and delivered to the listener through the receiver 495.

When all the recordings have been traversed by the pick-up 148, the latter is swung inward across the remaining blank record space by the radial component of the running friction between the needle and record, as set forth in the previously mentioned co-pending application Serial No. 239,773, until the switch arm 560 is closed on the contact point 561, Figure 20*a*, whereupon the trip solenoid 325 releases the switch 318, allowing the latter to spring up to normal position as shown.

The pick-up trip magnet 114 being de-energized, the related control mechanism completes its cycle, raising the pick-up from the record and stopping the motor 47. If the operator desires to listen to the messages again, he again depresses the switch 318 and the entire cycle is repeated as described, except that the recording mechanism having already been disengaged at the beginning of the immediately preceding play-back, this function is not required of the mechanism during the second cycle, the recording mechanism simply remaining disengaged until the next operation of the "automatic" switch 317.

If at any time the operator wishes to terminate play-back before all recordings are reproduced, he simply hangs up the hand-set 199, whereupon closure of the hook-switch contact 501 causes the trip solenoid 325 to release the "play-back" switch 318.

*Answer-back*

By the term "answer-back" is meant the function by which the employer of the present device may call up from an outside location and have automatically repeated to him over the telephone any messages recorded by the machine in his absence, the machine of course having been set for "automatic" operation as previously described.

In the preferred arrangement shown in Figures 20–20*a*, the device is provided with the second line connection 527—528 to the central office, this line being assigned a number differing from that of the regular line 327—328 and preferably being unlisted, in order that the user may keep his messages confidential. When he calls this number, ringing current over the lines 527—528 operates the second ringing relay 531 which in turn, acting through the monitor relay 539, throws in the "answer-back" relay 526, Figure 20*a*. By its connections previously described in full detail, actuation of the relay 526 locks out all functions of the normal answer-and-record cycle, and instead directs the machine through the same cycle as described under "play-back," except that the reproduced messages, instead of being directed to the receiver 495, are sent through the repeating coil 335 and thence out over the lines 527—528 to the calling telephone, where they are received by the caller. When the reproduction is complete, the previously described run-in of the pick-up 148 opens the contact 593, Figure 20*a*, breaking the holding circuit of the relay 526 and thereby returning the device to the normal automatic answer-and-record set-up. However, since during the reproducing cycle the embossing recorder 68 has been disengaged from the record, the elevating slide bar 91 has returned the switch 518 to its normal position shown in Figure 20*a*. Therefore, as soon as completion of the pick-up control cycle permits the interlock contact 455 to close, the trip magnet 119 is energized, causing the recorder to be lowered into engagement with the record disk and to trace a lead-in spiral thereon in the same described manner as when the "automatic" switch was initially set. The device is thus again prepared to answer and receive any additional incoming messages.

It has been previously described at length in connection with Figures 16 to 19 how the pick-up stop arm 161 and related parts operate in each case to limit the play-back to those messages which have been recorded since the last setting of the machine for "automatic" operation. This stop apparatus, which may appropriately be termed the zone selector, normally operates in the same manner during answer-back so that when the user calls repeatedly for answer-back, he receives in each case only the new messages recorded since his last previous call.

In general this provision is obviously advantageous, as it avoids the necessity of listening through a number of previously noted messages before discovering whether any new ones have been recorded. However, on some occasions the user may desire the opposite effect, in other words, he may wish to have the same messages repeated on successive answer-back calls, in order to check their content, refresh his mind, etc. To permit this mode of operation, a manually operable switch 597, Figure 20*a*, is provided in the current supply line to the stop-release magnet 170.

When, as noted above, the user wishes to provide for repeated reproduction of the recorded messages by answer-back, before leaving the machine he opens the switch 597. This disables the stop release magnet circuit, leaving the zone selector fixed in the position last assumed by it, so that all subsequent messages will be repeated on all answer-back calls, or similarly on ordinary play-backs, until the switch 597 is closed to restore the automatic zone-selector function.

*Answer only*

Upon occasion it may be desired to utilize the device simply for answering and re-directing calls, without recording incoming messages. To provide for this type of service, the user throws the manual switch 427, Figure 20. This operation, by opening the contact 450, disables the mid-cycle relay 349, while at the same time the conductor 428 is electrically disconnected from the contact point 426 and connected via a second point 598 and a branch 599 to the conductor 413, thence to the normally closed back contact 414 of the mid-cycle switch 306. Since when the "automatic" switch 317 is set the conductor 428 comprises part of the holding circuit for the main relay 340, the above shift provides that current for this holding circuit no longer comes through the normally closed breaker 389 of the message timer 346, but instead through the mid-cycle switch 306. Therefore, when upon completion of the talk-out message the mid-cycle switch 306 is thrown by the rocker 293 as previously described, the opening of the back contact 414 breaks the holding circuit and thereby drops out the main relay 340 to terminate the cycle. The previously noted disabling of the mid-cycle relay 349 prevents any momentary closing of this relay in case it normally tends to operate more rapidly than the main relay releases.

*Alternative electrical arrangements*

The foregoing description of the device has set forth the normal automatic answering-and-recording cycle and the playback cycle as operating over separate telephone lines 327–328 and 527–528 respectively. In other types of service providing for multiple answering stations on a single line pair, for example by harmonic ringing, the ringing relays 332 and 531 may be of the tuned type responsive to the proper differing frequencies. In this case the inner line conductors 330 and 530 are connected by a strap 604, Figure 20, the inner line conductors 331 and 529 are similarly joined by a strap 605, and the second line 527–528 is eliminated. The operation of the device with this arrangement is the same as that already described, except that the single line 327–328 serves both for automatic answering and answer-back, as well as the local telephone 329.

Figure 29 illustrates two optional modifications in the internal electrical connections and apparatus. To avoid undue multiplicity of drawings the two are illustrated in a single figure, but it will be understood that either may be used without the other. Figure 29 is a partial diagram relating to Figures 20 and 20*a*, only such elements of the latter being shown as are necessary to illustrate all alterations therein entailed by the modifications.

In the first modification the separate ringing relays 392 and 53*k*, Figure 20, are dispensed with and the monitor relay 539 is made to perform their functions directly. For this purpose the first magnet 538*a* of the relay 539 is so constructed as to be responsive to the ringing current of interior line conductors 330 and 331, being connected across the latter through the condenser 333, as shown in Figure 29. Similarly, the second magnet 540*a* is made responsive to the ringing current of internal line conductors 529 and 530 via the condenser 532. Closure of the contact 543 directs actuating current via the conductor 544 to the main relay 340 in the same manner as described for Figure 20, except that the normally closed limit switch 371 is incorporated directly in this circuit. The contact 548 similarly is adapted to supply actuating current to the answer-back relay 526 through the previously-described conductor 549 as in Figures 20 and 20*a*.

The second modification is for use with certain systems involving equipment in which hang-up of the remote telephone causes a momentary interruption or other alteration of the central station battery current in the local line. For use with such systems a properly wound direct current relay 606, Figure 29, may be connected in parallel with the outer repeating coil winding 334, so as to be energized by the central station battery when actuation of either the main relay 340 or the answer-back relay 526 connects the winding 334 across the line. The holding circuit contacts 432 and 590 respectively of the relays 340 and 526 are connected in series with corresponding normally open contacts 432*a* and 590*a* on the relay 606, Figure 29, all the circuit connections of the former contacts remaining the same except for the above series inclusions therein.

Consequently, when either the main relay 340 or answer-back relay 526 is actuated, its holding circuit includes closure of the relay 606. If the remote telephone is held open until the end of the normal recording period or the answer-back reproduction is complete, the operative cycles are terminated by the timer 346 or breaker 560 respectively, in the normal manner already explained. However, if the calling party hangs up before the completion of the normal cycle in progress, the above-noted interruption or alteration of the direct line current causes the relay 606 to drop out, breaking the holding circuit of whichever relay 340 or 526 is in operation and thereby terminating the operating cycle at once. As a result, recording space is saved in the case of short incoming messages, or when the caller, having received all desired information from the talk-out message, hangs up without delivering any message himself. Similarly, if for any reason the user hangs up on answer-back before the latter is completed, the machine stops and re-sets at once, eliminating further unnecessary operation.

In the preceding description of the operations of the machine, it has been shown that all normal control of the embossing recorder head 68 and the pick-up 148 is performed automatically, no direct manipulation thereof being required of the operator. This arrangement has the obvious advantages of precision control and the avoidance of possible injury to the recording and pick-up parts through rough handling by unskilled persons. However, under exceptional circumstances it may be desirable to provide for limited manual control of the location of the above devices. For example, occasionally the operator may wish to remove and later replace a partially filled record blank, in order to re-play a previously filled record in the meantime. However, since opening the flap 176 to change records automatically moves the recorder head 68 to the outer edge of the recording zone, as shown in Figure 4, it is necessary to move the head inward to the unrecorded zone of the partially filled blank when the latter has been replaced. For this purpose the following provision is made:

A transverse hinged shutter 607 on the flap 176, Figures 1 and 2, overlies a depressed slot 608 extending transversely above the path of the recorder head 68, as shown in Figure 4. A small lever 609 is pivoted to the top of the recorder cap 82 in such position as to protrude upward into the slot 608 only when the recorder is in raised or disengaged position. A spring 610 urges the lever 609 toward the right, Figure 4, a small foot 611 bearing against the cap 82 to define the normal upright position of the lever.

The previously mentioned transparent window 181 in face 180 of the flap 176, Figures 1 and 2, is adapted to allow the front of the recorder cap 82 to be seen throughout its transverse travel. The window 181 is provided with a reference scale 612 as shown in phantom, Figure 4, this scale being cooperative with an indicator line 613 on the front of the recorder cap.

The normal utility of the above scaled window and indicator line 613 is to enable the user to observe the amount of blank recording space remaining on the record blank at any time. In the exceptional case outlined above, when the partially filled blank is to be removed and replaced, the user first notes the position of the line 613 on the scale 612. Thereafter, when the partially filled blank has been replaced in the machine, the operator may open the shutter 607, and with the end of a finger engaging the lever 609, move the recorder mechanism back to the noted original position.

The lever 609 cannot be used erroneously to move the recorder head when the latter is engaged with the record, since in this lowered position the lever does not protrude upward through the slot 608. Similarly, the recorder cannot be accidentally moved outward to endanger previous recordings, as reverse pressure against the lever 609 merely collapses the latter to the left and downward through the slot 608, without moving the attached parts.

A condition making manual positioning of the pick-up desirable may arise when the user wishes to re-play certain messages of a recorded group but does not wish to play the others in the group. A typical case would be one in which the desired messages are comprised on a record completed at some earlier date and filed for reference means. To make possible rapid location of the desired messages is provided as follows, referring to Figures 4 and 14:

A downwardly directed pin 614, secured to the bridge plate 175, has swivelled thereon a sleeve 615 carrying on its lower end an angle lever 616 extending over the pick-up arm 145 and adapted to engage the rear thereof when the sleeve is rotated. A second lever 617 is secured to the top of the sleeve 615 and extends forwardly under a second slot 618 also normally covered by the shutter 607. The slot 618 is wide enough to admit the user's finger, so that he may swing the lever 617 laterally. The lever 617, which is of spring material allowing it slight vertical resilience, normally swings clear of the inner shutter and flap surfaces, and is held near the right end of the slot by a light spring 619 so that the angle lever 616 normally remains entirely clear behind the pick-up arm 145 throughout the latter's path of swing.

If the user wishes to operate the manual control as outlined above, he first opens the shutter 607. A wide toe 620 on the shutter 607 extends downwardly and rearwardly through the slot 618. As the shutter is opened the toe 620 swings down into engagement with the lever 617 and bends the latter downward, placing sufficient friction on the lever to retain it in any position to which it may later be moved. The operator then takes up the hand-set 199, starts the usual play-back cycle by depressing the button-switch 318, and listens to the recordings. If the desired messages occur at the beginning of the recorded zone, of course, no manual re-location of the pick-up is required. However, if this is not the case, and assuming the operator does not remember the approximate location of the message in question, he may move the lever 617 toward the left, causing the angle-lever 616 to engage the pick-up arm 145 and slide the pick-up inward across the recordings. By repeated small inward movements of the pick-up, meanwhile sampling the recordings, the record may be searched rapidly until the desired messages are located.

Obviously, if the operator already remembers the approximate desired location, for instance if he recollects that certain messages occurred near the end of a record, he may simply pre-set the lever 616 to cover that general location, and send the machine through its play-back cycle without searching, the angle-lever 616 serving as a locating stop instead of the automatic zone selector stop 160, Figure 16. Upon completion of the selective play-back, closure of the shutter 607 releases the lever 616, allowing the spring 610 to retract the described manual control combination and thus returning the play-back control to the automatic zone selector mechanism as previously set forth.

Under circumstances such as the above, the use of the described manual selector effects a large saving in time, particularly as in preferred form the recording on the disk 85 is of the fine-line low-speed type in which a single side of a disk may accommodate an hour's recording. In the searching operation no lifting of the pick-up is necessary, it having been determined that due to the light pressure of the pick-up needle 149 and the shallowness of the embossed grooves, no injury to the recording results from moving the needle across the grooves while maintaining contact.

As a minor alternative in electrical arrangement, the magnets of the main relay 340, answer-back relay 526, mid-cycle relay 452, also the feed-trip magnet 259 and timer release magnet 301, may obviously be provided with suitable rectifiers of well known type, to eliminate any possibility of A. C. hum developing during the various operating cycles.

It will be evident to those skilled in the art that the provision of the device's individual hand-set for recording talk-out and for listening to recorded messages presents important advantages over devices either employing separate microphones and loud-speakers or involving interconnection to to the subscriber's line telephone. In the first place, the familiar contour of the hand-set tends automatically to facilitate proper transmitter location during talk-out recording, a spacing notoriously difficult for inexperienced persons attempting to use an ordinary microphone. Similarly, the use of the hand-set receiver avoids the usual loud-speaker characteristic of virtually broadcasting messages which may be confidential.

Secondly, since no interconnection to the user's line telephone 329 is necessary as noted, installation is greatly simplified, the device being connected to the regular telephone line 327—328 in the manner of an ordinary extension at any point near or remote from the regular telephone 329 as desired. The flexibility of arrangement, saving of desk space, etc., will be obvious. Also, since no operative connection whatever exists between the answering instrument and the telephone line 327—328 except during the actual automatic functions, the main telephone and its line are free for independent use in the ordinary manner while the machine is set for play-back, talk-out recording or test play-back.

Furthermore, the "extension" arrangement permits the user, while present in his office and presumably very busy, to give immediate attention to certain selected incoming calls, while deferring others for later attention. For this purpose he sets the machine for automatic operation with an appropriate talk-out message. As calls come in and the machine responds, the user may take up his main telephone and listen in on the incoming message. If the latter is one to which a deferred answer is indicated, he simply hangs up again while the machine records the message. If, on the other hand, the incoming message calls for an immediate reply, he may either call back at once after recording is complete, or if desired, he may break in on the message itself and carry on the conversation directly as long as necessary.

A third and highly important advantage of the machine's individual hand-set provision lies in the use of the hook-switch 377 as a principal element in the control and interlocking circuits as described, eliminating the necessity for multiple switch set-ups by the operator. Thus the user, by the mere familiar and necessary operation of raising or hanging up the hand-set, effects connections which reduce the requirement for any desired operational set-up to the pushing of a single appropriate button.

With further respect to the push-button control feature, it has been noted in connection with Figures 15, 20 and 20*a* that the "talk-out record" switch 315 is preferably of the self-releasing type, so that the talk-out recording cycle may be terminated either by removing the finger from this switch or by hanging up the hand-set 199. It will be obvious, however, that if desired this switch may be made of the same lock-down type as the other three button switches. To effect this modification, the releasing member 322, Figure 15, is simply notched in the same manner as members 321, and the switch 315 is provided with an additional normally open contact paralleling the similar contact 499 of the "test" switch 316, that is adapted to connect the conductor 500, Figures 20—20*a*, to the release solenoid lead 497. By this arrangement the user may remove his finger from the switch 315 while recording, without terminating the cycle, release of this switch 315 thereafter being attainable either by hanging up the hand-set or by depressing another button.

In the prior description of the device as arranged for differentiation between normal incoming calls and incoming "answer-back" calls over a single line, the use of harmonic or frequency ringing currents was mentioned as an illustration. To further illustrate the adaptability of the device to various other types of multi-party signalling, Figure 30 shows a hook-up for grounded "two-party" ringing currents.

For this purpose the internal line conductors 529 and 530 are bridged respectively to conductors 330 and 331 by straps 621 and 622. The ringing current condensers 333 and 532, instead of being disposed in circuits across the two main telephone line conductors, are connected to a common ground conductor 623 via a terminal G provided for the purpose. Ringing current between main telephone line conductor 328 and ground 623 energizes the relay magnet 538*a* to effect normal answering and message recording as previously described, while ringing current between line conductor 327 and ground 623 similarly energizes the magnet 540*a* to start the "answer-back" cycle. It will be obvious that this grounded ringing arrangement may similarly be applied to the separate ringing relays 332 and 531 illustrated in Figure 20, when it is desired to operate "answer-back" via the single main phone line set forth.

While the invention has been described in preferred form, it is not limited to the precise embodiments illustrated, as various modifications may be made without departing from the scope of the appended claims.

What is claimed is:

1. In telephone answering apparatus, in combination, a phonograph including means to reproduce a pre-recorded talk-out message, a second phonograph including means to effect recordings thereon and means to reproduce the same, a telephone line, means responsive to ringing current on said line to actuate said first phonograph and to operatively connect said first reproducing means to said line whereby said talk-out message may be transmitted thereover, switching means controllable by said first phonograph upon completion thereby of said talk-out message to actuate said second phonograph, said switching means including means to disconnect said first reproducing means from said telephone line and to operatively connect said recording means thereto whereby messages received over said line may be recorded on said second phonograph, a second telephone line, and means responsive to ringing current on said second line to actuate said second phonograph and to operatively connect said second reproducing means to said second line whereby said recorded received messages may be transmitted over said second line, said last-named actuating means including means to disable said first-named actuating means.

2. In a telephone answering device for use with a telephone circuit adapted to carry selective ringing currents for two-party service over a single line thereof, in combination; a phonograph including means to reproduce a pre-recorded talk-out message, a second phonograph including means to effect recordings thereon and means to reproduce the same, means responsive to one of said ringing currents to actuate said first phonograph and to operatively connect said first reproducing means to said line whereby said talk-out message may be transmitted thereover, switching means controllable by said first phonograph upon completion thereby of said talk-out message to actuate said second phonograph, said switching means including means to disconnect said first reproducing means from said telephone line and to operatively connect said recording means thereto whereby messages received over said line may be recorded on said second phonograph, and means responsive to said second selective ringing current to actuate said second phonograph and to operatively connect said second reproducing means to said telephone line while disabling said recording means, whereby said recorded received messages may be transmitted over said line.

3. A device as claimed in claim 2 including means to pre-record said talk-out message on said first phonograph, and wherein said switching means includes trip means adjustable by said first phonograph during said pre-recording to condition said switching means for operation at said end of said reproduced talk-out message.

4. The combination as claimed in claim 1 including means to establish a holding circuit for said second phonograph to maintain the same in operation, a relay having a normally open contact and an operating coil, said contact when closed comprising a series element of said holding circuit, and wherein said first and second ringing-current responsive actuating means include means to selectively connect said operating coil across said first and said second telephone lines respectively.

5. The combination claimed in claim 1 including means to establish individual holding circuits for said first and said second phonographs to maintain the same in operation, a relay having a pair of normally open contacts and an operating coil, said contacts when closed being adapted to comprise series elements of said individual holding circuits, and wherein said first and second ringing-current responsive actuating means include means to selectively connect said operating coil across said first and said second telephone lines respectively.

6. The combination claimed in claim 1 including means to disable said recording means during said operation of said second reproducing means, means to re-enable said recording means, and means controllable by said recording means to limit said reproduction of said recorded received messages to those messages received subsequently to the latest re-enabling of said recording means.

7. In an electrically operable telephone answering device adapted to be attached to a telephone line and to a source of operating current, in combination, a phonograph adapted to reproduce a pre-recorded answering message, a second phonograph including means to support a removable recording medium and recording means cooperative with said medium and means to clamp said recording medium to said supporting means, means responsive to ringing current on said telephone line to establish an operative current supply circuit from said current source to said first phonograph and to operatively connect said first phonograph to said telephone line, switching means controllable by said first phonograph to establish an operative current supply circuit to said second phonograph and to operatively connect said second phonograph to said telephone line, and means adapted to be actuated by said clamping means in the absence of said recording medium to disable said current supply circuits.

8. The combination claimed in claim 7 including a casing normally enclosing both said phonographs, said casing having a movable portion manually openable to give access to said record medium and to release said clamping means, and means connected to said movable portion and operable by said opening of the same to withdraw said recording means from said recording medium.

9. The combination claimed in claim 7 including a casing normally enclosing both said phonographs, said casing having a movable portion manually openable to give access to said record medium and to release said clamping means, means connected to said movable portion and operable by said opening of the same to withdraw said recording means from said recording medium, and a switch controllable by said movable portion upon said opening thereof to disable said current supply circuits.

10. The combination claimed in claim 7 wherein said recording medium and said supporting means comprise respectively an annular disk of insulating material and a rotary turntable therefor, including a domed hub on said turntable adapted to guide said disk into concentric position thereon, said clamping means including a cup adapted to engage said disk in a circular zone surrounding said hub, and contact means in said turntable normally engaging said disk and adapted to engage said cup in the absence of said disk, said disabling means including a relay and means to establish an operative circuit therefor through said engaged contact means and said cup.

11. The combination claimed in claim 9 wherein said recording medium and said supporting means comprise respectively an annular disk and a rotary turntable therefor, including a tapered hub on said turntable adapted to guide said disk into concentric position thereon as said clamping means is actuated, and means to disengage said disk from said turntable as said clamping means is released.

12. In a device for attachment to a telephone line, in combination, a phonograph including a recording medium, means to move said medium, means to effect recordings on said moving medium, means responsive to ringing current on said attached telephone line to actuate said phonograph and to operatively connect said recording means to said telephone line whereby messages incoming thereover may be recorded on said medium, means to reproduce said messages while disabling said recording means, and means controllable by said recording means to limit said reproduction to those messages recorded subsequently to the last prior disabling of said recording means.

13. The combination claimed in claim 12 including means to disable said limiting means.

14. In an electrically operable telephone answering and recording device for use with a first and a second telephone line, in combination, a phonograph including recording means and reproducing means, means to energize said phonograph and to operatively connect said recording means thereof to said first telephone line, second means to energize said phonograph and to operatively connect said reproducing means thereof to said second telephone line, and common means responsive to ringing current on said first line to actuate said first energizing and connecting means and responsive to ringing current on said second line to actuate said second energizing and connecting means.

15. The combination claimed in claim 14 wherein said common actuating means includes a relay having a magnet coil operatively connected to said first telephone line, a second magnet coil operatively connected to said second telephone line, and switching means selectively movable in one direction to close an actuating circuit for said first energizing and connecting means and in the opposite direction to close an actuating circuit for said second energizing and connecting means, said switching means including a common armature movable in said first direction in magnetic response to said first coil and in said opposite direction in magnetic response to said second coil.

16. The combination claimed in claim 14 including a ringing relay operatively connected to said first telephone line, a second ringing relay operatively connected to said second telephone line, and wherein said common actuating means includes a monitor relay having opposed first and second electro-magnets controllable respectively by said first and second ringing relays, and switching means movable in opposite directions to selectively establish actuating circuits for said first and said second energizing and connecting means, said switching means including a common armature magnetically responsive to both said opposed electro-magnets.

17. The combination claimed in claim 14 including a holding relay having a coil responsive to direct current and normally open contact means, each of said energizing and connecting means including switching means to connect said coil across the conductors of said respective connected telephone lines whereby direct current on said respective lines may energize said relay coil to close said contact means, and wherein each of said energizing and connecting means includes means to establish a holding circuit for maintaining said device in operation, each of said holding circuits including said closed contact means.

18. In an electrically operable telephone answering and recording device for use with a telephone line adapted to provide selective two-party ringing currents, in combination, a phonograph including recording means and reproducing means, means to energize said phonograph and to operatively connect said recording means to said telephone line, second means to energize said phonograph and to operatively connect said reproducing means to said telephone line, and common means responsive to one of said ringing currents to actuate said first energizing and connecting means and responsive to said other ringing current to actuate said second energizing and connecting means.

19. The combination claimed in claim 18 wherein said common actuating means includes a relay having a magnet coil connected to said telephone line in operative circuit responsive to said first selective ringing current and a second coil connected to said telephone line in operative circuit responsive to said second selective ringing current, and switching means selectively movable in one direction to close an actuating circuit for said first energizing and connecting means and in the opposite direction to close an actuating circuit for said second energizing and connecting means, said switching means including a common armature movable in said first direction in magnetic response to said first coil and in said opposite direction in magnetic response to said second coil.

20. The combination claimed in claim 18 including a ringing relay operatively connected to said telephone line and responsive to said first selective ringing current thereon, a second ringing relay operatively connected to said telephone line and responsive to said second selective ringing current thereon, and wherein said common actuating means includes a monitor relay having opposed first and second electro-magnets controllable respectively by said first and second ringing relays, and switching means movable in opposite directions to selectively establish actuating circuits for said first and said second energizing and conducting means, said switching means including a common armature magnetically responsive to both said opposed electro-magnets.

21. The combination claimed in claim 18 including a holding relay having a coil responsive to direct current and normally open contact means, each of said energizing and connecting means including switching means to connect said coil across the conductors of said telephone line whereby direct current on said lines may energize said relay coil to close said contact means, and wherein each of said energizing and connecting means includes means to establish a holding circuit for maintaining said device in operation, each of said holding circuits including said closed contact means.

References Cited in the file of this patent

UNITED STATES PATENTS

| | | |
|---|---|---|
| 2,289,555 | Simons | July 14, 1942 |
| 2,359,489 | Proctor et al. | Oct. 3, 1944 |
| 2,393,272 | Van Deventer | Jan. 22, 1946 |
| 2,490,771 | Begun | Dec. 13, 1949 |
| 2,507,385 | Shrader | May 9, 1950 |
| 2,537,406 | Handschin | Jan. 9, 1951 |
| 2,537,407 | Handschin | Jan. 9, 1951 |
| 2,549,548 | Von Zimmermann | Apr. 17, 1951 |
| 2,665,337 | Handschin | Jan. 5, 1954 |
| 2,673,242 | Van Deventer | Mar. 23, 1954 |
| 2,761,899 | Keith | Sept. 4, 1956 |